(12) United States Patent
Ojard

(10) Patent No.: US 7,359,426 B2
(45) Date of Patent: *Apr. 15, 2008

(54) METHOD AND SYSTEM FOR MODULATING AND DEMODULATING SIGNALS IN ULTRA-WIDE BAND (UWB) COMMUNICATION SYSTEMS

(75) Inventor: Eric Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 758 days.

This patent is subject to a terminal disclaimer.

(21) Appl. No.: 10/822,595

(22) Filed: Apr. 12, 2004

(65) Prior Publication Data

US 2004/0190641 A1 Sep. 30, 2004

Related U.S. Application Data

(63) Continuation-in-part of application No. 09/169,552, filed on Oct. 9, 1998, now Pat. No. 6,327,311.

(60) Provisional application No. 60/509,658, filed on Oct. 8, 2003.

(51) Int. Cl.
 H04B 1/69 (2006.01)
 H04B 1/38 (2006.01)
(52) U.S. Cl. .................. 375/130; 375/219
(58) Field of Classification Search ........... 375/130, 375/219, 220, 222, 223, 261, 270, 271, 301, 375/321
See application file for complete search history.

(56) References Cited

U.S. PATENT DOCUMENTS 6,327,311 B1 12/2001 Ojard 7,035,663 B1 * 4/2006 Linebarger et al. ...... 455/552.1
2005/0240607 A1 * 10/2005 Melick et al. ............. 707/100

OTHER PUBLICATIONS

IEEE P802.15 Working Group for Wireless Personal Area Networks (WPANs), Mar. 2003.

Namgoong W: "A Channelized Digital Ultrawideband Receiver"; IEEE Transactions on Wireless Communications, IEEE, Piscataway, US; vol. 2, No. 3, May 2003, pp. 502-510; XP001163633; ISSN: 1536-1276.

(Continued)

Primary Examiner—Don N. Vo
(74) Attorney, Agent, or Firm—McAndrews, Held & Malloy, Ltd.

(57) ABSTRACT

In a transceiver system a passband single carrier transmitter is coupled to a first ultra-wide-band wireless transmission channel and a receiver may be coupled to the ultra-wide-band wireless transmission channel. The receiver may receive signals transmitted by the passband single carrier transmitter over the ultra-wide-band wireless transmission channel at a baud rate less than or equal to half of a spectral bandwidth of the signal transmitted by the passband single carrier transmitter. A passband single carrier transmitter may transmit a symbol stream via lossy ultra-wide-band wireless transmission channel at an adaptively chosen baud rate that is based on the lossy ultra-wide-band wireless transmission channel. The adaptively chosen baud rate may vary over a range that includes baud rates less than or equal to half of a spectral bandwidth of the transmitted symbol stream. A receiver may receive the transmitted symbol stream from the lossy ultra-wide-band wireless transmission channel.

26 Claims, 18 Drawing Sheets

OTHER PUBLICATIONS

Y Ma et al: "Acquisition Performance Of An Ultra Wide-band Communications System Over A Multiple-Access Fading Channel", IEEE Conference on Ultra Wideband Systems and Technologies, May 21, 2002, pp. 99-103; XP002310817.

Ramirez-Mireles F: "Performance of Ultrawideband SSMA Using Time Hopping and $M$-ary PPM", IEEE Journal on Selected Areas in Communications, IEEE Inc., New York, US; vol. 19, No. 6, Jun. 2001, pp. 1186-1196; XP001103037; ISSN: 0733-8716.

* cited by examiner

POWER SPECTRUM OF COMPLEX BASEBAND DATA SIGNAL

POWER SPECTRUM OF COMPLEX LOW-PASS FILTERED SIGNAL

RIGHT-HANDED POWER SPECTRUM OF REAL FREQUENCY-DIVERSE SIGNAL

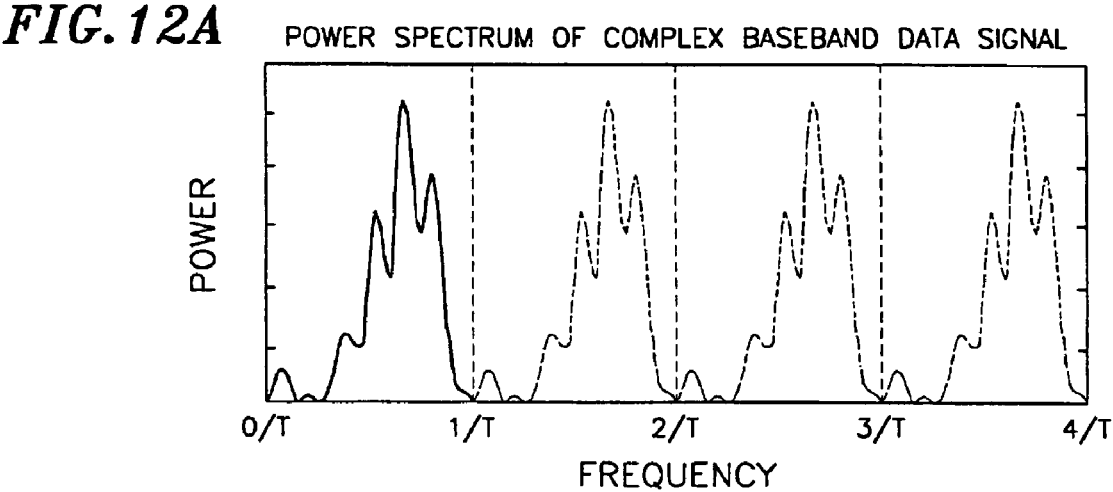
*FIG.12A* POWER SPECTRUM OF COMPLEX BASEBAND DATA SIGNAL
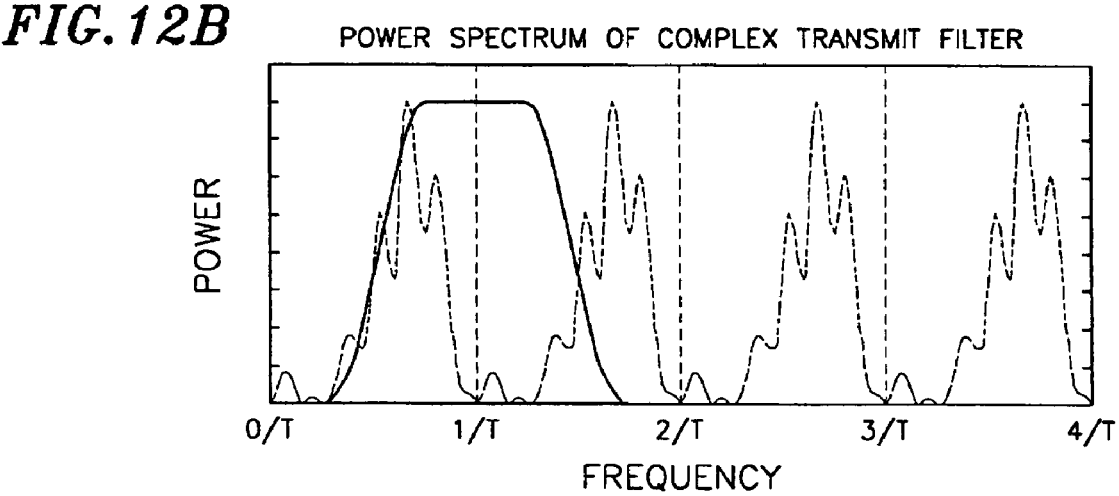
*FIG.12B* POWER SPECTRUM OF COMPLEX TRANSMIT FILTER
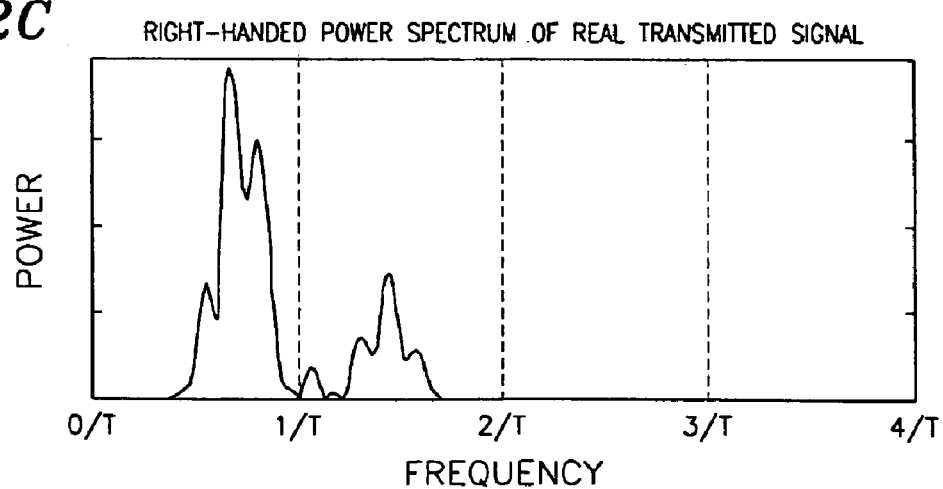
*FIG.12C* RIGHT-HANDED POWER SPECTRUM OF REAL TRANSMITTED SIGNAL

METHOD AND SYSTEM FOR MODULATING AND DEMODULATING SIGNALS IN ULTRA-WIDE BAND (UWB) COMMUNICATION SYSTEMS

CROSS-REFERENCE TO RELATED APPLICATIONS/INCORPORATION BY REFERENCE

This application is a continuation-in-part of application Ser. No. 09/169,552 filed Oct. 9, 1998 now U.S. Pat. No. 6,327,311 issued Dec. 4, 2001.

This application is also makes reference to, claims priority to, and claims the benefit of U.S. Provisional Application Ser. No. 60/509,658, filed Oct. 8, 2003.

The above stated applications are hereby incorporated herein by reference in their entirety.

FIELD OF THE INVENTION

The present invention relates to high-speed data transmission in wireless systems. More specifically, the invention provides an efficient modulation and demodulation technique for robust data communication in ultra-wide band (UWB) systems.

BACKGROUND OF THE INVENTION

Characteristics of Wiring in Homes and Buildings

In many instances, it is desirable to install communications networks in homes and businesses using the pre-existing wiring. Utilizing the pre-existing wiring allows the homeowner or business owner to network the building using the existing copper infrastructure without a major investment in the installation of optical fiber or other network transmission media. However, the network also needs to be capable of transmitting data at high data rates.

The pre-existing wiring (i.e., telephone wiring and power wiring) of most homes and other buildings is not of uniform type and may consist of 24 gauge twisted quad wiring, unshielded flat pair, or other miscellaneous types of wiring. This wiring can produce severely distorted transmission channels. FIG. 1 shows an example of a network 100 using existing 24 gauge twisted copper, such as the existing telephone lines in a home or business. Network 100 includes a main line 101 and trunk lines 102, 103 and 104, which are each coupled at one end to main line 101. Main line 101 includes a signal source 105 at one end and a receiver terminator 106 at the opposite end. Receiver terminator 106 provides main line 101 with a 100 Ohm termination. In FIG. 1, main line 101 is 360 feet long. Trunk line 102 is 80 feet long and is coupled to main line 101 at a point 170 feet from signal source 105. Trunk line 103 is 25 feet long and is coupled to main line 101 at a point 90 feet from receiver terminator 106. Trunk line 104 is 25 feet long and is coupled to main line 101 at a point 40 feet from receiver terminator 106. Trunk lines 103 and 104 each have open, un-terminated ends (i.e., infinite termination) opposite the end that is coupled to main line 101. Trunk line 102 includes a 100 ohm terminator at an end opposite the end of trunk line 102 that is coupled to main line 101. Other examples of networks can include any number of terminated, un-terminated or improperly terminated lines.

FIG. 2 shows the frequency response of the transmission channel between signal source 105 and receiver terminator 106 of network 100 shown in FIG. 1. The un-terminated trunk lines, trunk lines 103 and 104, cause a deep null in the spectrum of the frequency response. Other networks may have multiple spectral nulls or a differently shaped frequency response.

Other sources of spectral nulls or distortions in the frequency response of a transmission channel include filters to reject interference from HAM radio bands. FIG. 3 shows the combined response of transmit and receive filters in a passband modulated transceiver, including RFI suppression filters, for a transmission band of between 4 MHz and 10 MHz. The spectral null in the center of the spectrum suppresses the 40 meter HAM band.

As long as the signal-to-noise ratio of a received signal is sufficiently high, channel distortion can be corrected by equalization. Near-optimal throughput can be achieved by using a decision-feedback equalizer or equivalent structure. (See G. D. Forney, Jr., and M. V. Eyuboglu, Combined Equalization and Coding Using Precoding, IEEE COMM. MAG., vol. 29, no. 12, pp. 25-34, December 1991.) An ideal decision-feedback equalizer (DFE) or equivalent precoding structure, in combination with a fractionally-spaced feed-forward equalizer (FSE), can correct the distortion from a transmission channel in an optimal manner, enabling the achievable throughput to approach the theoretical channel capacity arbitrarily closely with the use of sufficiently complex coding schemes (See J. M. Cioffi, et al., MMSE Decision-Feedback Equalizers and Coding—Part I: Equalization Results, IEEE TRANS COMM., vol. 43, no. 10, pp. 2582-2594, October 1995; J. M. Cioffi, et al., MMSE Decision-Feedback Equalizers and Coding—Part II: Coding Results, IEEE TRANS COMM., Vol. 43, no. 10, p. 2595-2604, October 1995).

However, when the transmission band of the channel contains deep spectral nulls and the signal-to-noise ratio is low, a large part of the transmission band may become unusable. This can easily happen when the transmitted signal power is limited and the spectrum of the transmitted signal is constrained within a narrow bandwidth to allow spectral compatibility with other signals on the transmission channel. In cases in which the power spectral density (PSD) is constrained or in which the SNR is limited by self-crosstalk, the frequency-dependent SNR is fixed and the SNR cannot be improved by increasing the transmit PSD. FIG. 4 shows a combined response of the transmit and receive filters of FIG. 3 and the transmission channel between signal source 105 and receiver termination 106 of FIG. 1. In FIG. 4, much of the spectrum is unusable because it is near or below the noise floor of −120 dBm/Hz.

In such cases where the signal-to-noise ratio is relatively low and the channel contains large spectral nulls, the achievable throughput for traditional single-carrier modulation using integral bits per symbol may be zero. For example, a single-carrier transceiver operating with a baud rate of 4 Mhz, a 15 dB gap (a measure of the difference between the theoretical channel capacity and the achievable channel capacity) and integer bits per symbol on a channel having the power spectral density shown in FIG. 4 has an achievable capacity of zero bits per symbol. Therefore, traditional single-carrier modulation fails. Single carrier modulation schemes are further discussed below. Theoretical capacity, achievable capacity, and the gap between them are further discussed below.

The problem of transmitting data through noisy channels having large spectral nulls is often solved by using transceivers that utilize either multicarrier modulation or frequency diverse modulation schemes. Multicarrier modulation or frequency diverse modulation schemes may provide acceptable throughput in such cases, but these schemes have additional implementation complexity and other practical disadvantages in comparison with single-carrier modulation transceivers.

Multi-Carrier Modulation

Multi-carrier modulation is a popular solution in some applications. The most common type of multi-carrier modulation is Discrete Multi-Tone (DMT) modulation. See J. A. Bingham, et al., Multicarrier Modulation for Data Transmission: An Idea Whose Time Has Come, IEEE COMM. MAG., May 1990, 5-14; I. Kalet, The Multitone Channel, IEEE TRANS. COMM., Vol. 37, No. 2, February 1989. On typical subscriber-loop channels, for example, DMT modulation generally achieves the same throughput as single-carrier modulation, assuming equivalent coding methods and properly optimized parameters. On severely distorted channels with large unusable spectral regions, however, DMT modulation transceivers may achieve better throughput than single-carrier modulation transceivers, especially when the capacity gap (see discussion of channel capacity below) is large.

DMT modulation transceivers have some disadvantages, however, as compared to single carrier modulation transceivers. A first disadvantage is that DMT modulation requires that the transmitter be informed of the transmission channel response. Therefore, DMT requires significant amounts of information flow from the receiver to the transmitter as well as data flow from the transmitter to the receiver. In addition, DMT modulation has a much higher peak-to-average ratio than single-carrier modulation, requiring the use of more expensive analog-to-digital and digital-to-analog converters with greater dynamic ranges than is required in single-carrier systems. DMT modulation also has less natural immunity to narrowband interference than single-carrier modulation. In addition, DMT modulation has a more complex transceiver structure compared to single-carrier modulation. These factors make DMT unattractive for many applications.

Frequency-Diversity

A frequency-diverse system is a system in which the transmitter of the transceiver modulates a signal with more than one carrier frequency, providing spectral redundancy in the transmitted signal (See T. RAPPAPORT, WIRELESS COMMUNICATIONS, PRINCIPLES AND PRACTICE, section 6.10.5 (1996)). The receiver of the frequency-diverse system then selects and demodulates the best frequency band or some combination of the different bands based on the characteristics of the transmission channel as measured at the receiver. Typically, the quality of the different frequency bands is unknown or time-varying because the network response is unknown or time-varying. A traditional frequency-diverse transceiver typically consists of two or more single-carrier transceivers in parallel. Although the transmitter does not require knowledge of the channel characteristics, the receiver must include additional logic to select the best frequency band. Additionally, the receiver requires a separate receiver structure for each modulation frequency, adding complexity to the receiver.

An example of a frequency-diverse QAM transceiver is shown in FIGS. 5A and 5B. FIG. 5A shows a transmitter 501 that transmits signals having multiple carrier frequencies $\omega_1$ through $\omega_N$. A host system 502 sends a symbol stream to transmitter 501. The symbol stream is split into its real and imaginary parts and filtered in transmit filter 506. Often, the input symbol stream is also upsampled and zerofilled in transmit filter 506. FIG. 6A shows an example of a power spectrum of a short sequence of data symbols transmitted at a baud rate of 1/T (i.e., T is the symbol period). In FIG. 6A, the solid line represents the base-band transmission spectrum and the dotted line is the repeated transmission spectrum that results from upsampling and inserting null samples between adjacent symbols. FIG. 6B shows the power spectrum of the complex output of a low-pass filter. In a QAM transceiver, for example, transmit filter 506 includes low-pass filters that yield the power spectrum shown in FIG. 6B given the signal power spectrum shown in FIG. 6A. In FIG. 6B, the spectral response of transmit filter 506 is shown by the dotted line. The spectral response of transmit filter 506 shown in FIG. 6B is of a 50% excess-bandwidth square-root raised cosine pulse.

In FIG. 5A, the real portion of the symbol stream is mixed with the functions $\cos(\omega_1 t)$ through $\cos(\omega_N t)$ in mixers 508-1 through 508-N, respectively.

The imaginary part of the sample stream is mixed with the functions $\sin(\omega_1 t)$ through $\sin(\omega_N t)$ in mixers 509-1 through 509-N, respectively. The output signals from mixers 508-1 through 508-N and 509-1 through 509-N are added in adder 510 and the sum is coupled to transmission channel 511. FIG. 6C shows the right-handed power spectrum of the real signal obtained by modulating the signal power spectrum shown in FIG. 6B by the carrier frequencies 1.0/T, 3.5/T and 6.0/T.

Transmitter 501, therefore, transmits each symbol of the symbol stream from host 502 onto transmission channel 511 N times using N different carrier frequencies. One or more frequency bands may be unusable, but in a well-designed system, it's unlikely that all bands would be unusable. The receiver can read the symbol from any of the N bands into which it is transmitted. Typically, the receiver chooses a particular band of transmission from which to receive signals based on an error analysis of the symbol stream received at the receiver.

FIG. 5B shows a receiver 512 for receiving the signals transmitted from transmitter 501 of FIG. 5A. Receiver 512 includes N individual receivers 513-1 through 513-N, one for each of the N modulation frequencies $\omega_1$ through $\omega_N$, respectively. The signal from transmission channel 511 is received into each of receivers 513-1 through 513-N. The signal is mixed with the function $\cos(\omega_1 t)$ through $\cos(\omega_N t)$ in mixers 514-1 through 514-N, respectively, and filtered in receive filters 516-1 through 516-N, respectively. The signal from transmission channel 511 is also mixed with the function $\sin(\omega_1 t)$ through $\sin(\omega_N t)$ in mixers 515-1 through 515-N, respectively, and filtered in receive filters 516-1 through 516-N, respectively. The output signals from receive filters 516-1 through 516-N combined into a real and imaginary portion and received by equalization/decider 517-1 through 517-N, respectively. The output signals from equalization/decider 517-1 through 517-N are received by receive host 518. Receiver host 518 receives the output signals from equalizer deciders 517-1 through 517-N and, based on a statistical analysis of the symbol stream, chooses a best symbol stream from the usable frequency bands. Other receiver hosts may take a weighted average of the output sample streams of equalizer deciders 517-1 through 517-N. The weighted average sample stream, then, is presented to a single equalizer structure that may include a decision feedback equalizer and a slicer.

The multi-tone solution and the frequency diversity solution, although capable of sending data through lossy transmission channels with large gaps in the available bandwidth, require the use of multiple modulators and demodulators. This adds complexity to the transceiver and increases cost, making it unattractive for some applications. There is a need for a single-carrier transceiver structure for transmitting signals through channels having large spectral nulls.

Characteristics of Wide-Band (WB) and Ultra-Wide-Band (UWB)

Ultra-wide-band refers to a type of wireless communication system that transmits energy over a very large bandwidth at a very low power-spectral density (PSD), relative to other non-UWB wireless systems. An 802.11a signal, which occupies about 20 MHz of bandwidth at a power spectral density (PSD) as high as 17 dBm/MHz, is an example of a typical non-UWB system. In contrast, under FCC rules, an ultra-wide-band signal must occupy at least 500 MHz of bandwidth, and it may occupy up to several GHz of bandwidth, at a maximum power spectral density of about −41.3 dBm/MHz. This difference in bandwidth and power spectral density naturally leads to modulation schemes that may be quite different from conventional narrowband wireless communications.

The ultra-wide-band environment also has several important differences when compared to the home phoneline environment. For example, the total available bandwidth for ultra-wide-band is much larger the home phoneline environment. This enables much larger ratios of signal bandwidth to symbol rate for ultra-wide-band. Additionally, the expected signal-to-noise ratio (SNR) is much lower, making higher-order quadrature amplitude modulation (QAM) constellations less useful. As a result, ultra-wide-band systems may typically employ quadrature phase shift keying (QPSK) or bi-orthogonal phase shift keying (BPSK), although other constellations may be utilized. Furthermore, an ultra-wide-band system is very likely to encounter interference from similar ultra-wide-band systems that may be operating in the same frequency band. Accordingly, while the frequency diverse single carrier modulation disclosed in U.S. Pat. No. 6,327,311 to Ojard is very useful for home phoneline environments, there is additional benefit to be gained by adapting it specifically to ultra-wide-band applications.

In a wireless personal area network (WPAN) environment, individual devices may form piconets. Within a single piconet, devices may communicate with each other, and communication may be coordinated among these devices so that the devices do not transmit at the same time. Although communication among devices within a piconet may be coordinated, communication among neighboring piconets may not be coordinated. Since neighboring piconets will not be coordinated, there is a strong potential for interference from adjacent uncoordinated piconets. Accordingly, it is highly desirable to minimize the effect of such interference.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a transceiver system comprising a first passband single carrier transmitter coupled to a first ultra-wide-band wireless transmission channel. The first receiver may be coupled to the first ultra-wide-band wireless transmission channel. The first receiver may be adapted to receive signals transmitted by the first passband single carrier transmitter over the first ultra-wide-band wireless transmission channel at a baud rate less than or equal to half of a spectral bandwidth of the signal transmitted by the first passband single carrier transmitter. The first passband single carrier transmitter and the first receiver coupled to the first ultra-wide-band wireless transmission channel is a first piconet. A piconet may comprise two or more devices.

A second passband single carrier transmitter may be coupled to a second ultra-wide-band wireless transmission channel. A second receiver may be coupled to the second ultra-wide-band wireless transmission channel. The second receiver may be adapted to receive signals transmitted by the second passband single carrier transmitter over the second ultra-wide-band wireless transmission channel at a baud rate less than or equal to half of a spectral bandwidth of the signal transmitted by the second passband single carrier transmitter. The second passband single carrier transmitter and the second receiver coupled to the second ultra-wide-band wireless transmission channel is a second piconet. The second piconet is adjacent to the first piconet.

The first passband single carrier transmitter may be adapted to transmit data within the first piconet at a first symbol rate and the second passband single carrier transmitter may be adapted to transmit data within the second piconet at a second symbol rate. The first passband single carrier transmitter within the first piconet may scan channels to determine symbol rates that are being utilized in neighboring piconets. The first passband single carrier transmitter within the first piconet may select and utilize a symbol rate that differs from the determined symbol rates that are being utilized in the neighboring piconets.

The first passband single carrier transmitter comprises an optional encoder that may encode bits to be transmitted in the transmitted signals with a code rate R, where R<1. The first passband single carrier transmitter may also comprise an interleaver that interleaves the encoded bits so that adjacent encoded bits in the transmitted signals are mapped to symbols widely separated in time. The first receiver comprises a channel matched filter sampled at a symbol rate and a symbol-spaced linear equalizer sampled at the symbol rate.

Another embodiment of the invention provides a method for communicating information wirelessly. The method may comprise transmitting data via a first passband single carrier transmitter coupled to a first ultra-wide-band wireless transmission channel. The transmitted data may be received by a first receiver coupled to the first ultra-wide-band wireless transmission channel, wherein the first receiver receives signals transmitted by the first passband single carrier transmitter via the first ultra-wide-band wireless transmission channel at a baud rate less than or equal to half of a spectral bandwidth of the signal transmitted by the first passband single carrier transmitter. The first passband single carrier transmitter and the first receiver coupled to the first ultra-wide-band wireless transmission channel is a first piconet.

A second passband single carrier transmitter may be coupled to a second ultra-wide-band wireless transmission channel and a second receiver may be coupled to the second ultra-wide-band wireless transmission channel. The second receiver may be adapted to receive signals transmitted by the second passband single carrier transmitter over the second ultra-wide-band wireless transmission channel at a baud rate less than or equal to half of a spectral bandwidth of the signal transmitted by the second passband single carrier transmitter. The second receiver receives signals transmitted by the second passband single carrier transmitter via the second ultra-wide-band wireless transmission channel at a baud rate less than or equal to half of a spectral bandwidth of the signal transmitted by the second passband single carrier transmitter. The second passband single carrier transmitter and the second receiver coupled to the second ultra-wide-band wireless transmission channel is a second piconet. The second piconet is adjacent to the first piconet.

Data may be transmitted within the first piconet at a first symbol rate by the first passband single carrier transmitter. Data may also be transmitted within the second piconet at a second symbol rate by the second passband single carrier transmitter. The first passband single carrier transmitter may be configured to scan channels from within the first piconet in order to determine symbol rates that are being utilized in neighboring piconets. A symbol rate may be selected for use, which differs from the determined symbol rates that are being utilized in the neighboring piconets by the first passband single carrier transmitter within the first piconet.

Bits to be transmitted in the transmitted signals may be encoded with a code rate R by an encoder integrated within the first passband single carrier transmitter, where R<1. The encoded bits may be interleaved by an interleaver integrated within the transmitter so that adjacent encoded bits are mapped to symbols widely separated in time in the transmitted signals. A channel matched filter integrated within the first receiver may be sampled at the symbol rate. A symbol-spaced linear equalizer integrated within the first receiver may also be sampled at the symbol rate.

A transceiver system is also provided which comprises a passband single carrier transmitter coupled to an ultra-wideband wireless transmission channel. The passband single carrier transmitter modulates a signal at a baud rate such that any spectral region of the signal is transmitted substantially by at least two spectral regions separated by integer multiples of the baud rate. A receiver coupled to the ultra-wideband wireless transmission channel may be adapted to receive the signals transmitted by the passband single carrier transmitter over the first ultra-wide-band wireless transmission channel. The receiver may process the at least two spectral regions to coherently sum the at least two spectral regions.

A method is also provided for transmitting data in a wireless channel. The method may comprise transmitting, using a passband single carrier transmitter, a symbol stream to a lossy ultra-wide-band wireless transmission channel at an adaptively chosen baud rate that is based on the lossy ultra-wide-band wireless transmission channel. The adaptively chosen baud rate may vary over a range that includes baud rates less than or equal to half of a spectral bandwidth of the transmitted symbol stream. The transmitted symbol stream may be received from the transmission channel. Error-sensitive data may be transmitted at a lower baud rate that is utilized to transmit less error-sensitive data over the lossy ultra-wide-band wireless transmission channel.

Another embodiment of the invention provides a method for communicating information in a wireless channel. The method may comprise the step of receiving a symbol stream from a lossy ultra-wide-band wireless communication channel, wherein the symbol stream is transmitted from a passband single carrier transmitter at an adaptively chosen baud rate that is based on said lossy ultra-wide-band wireless transmission channel. The adaptively chosen baud rate may vary over a range that includes baud rates less than or equal to half of a spectral bandwidth of the transmitted symbol stream.

The invention also comprises a receiver coupled to an ultra-wide-band wireless transmission channel that receives signals transmitted by a passband single carrier transmitter at a baud rate less than or equal to half of a spectral bandwidth of the signals that are transmitted by the passband single carrier transmitter.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 12A through 12C show power spectra of a short complex data burst as it is transmitted through a conventional CAP or QAM transceiver system.

In the figures above, components that have the same or similar functions have identical identifiers.

DETAILED DESCRIPTION OF THE INVENTION

Figure 1:
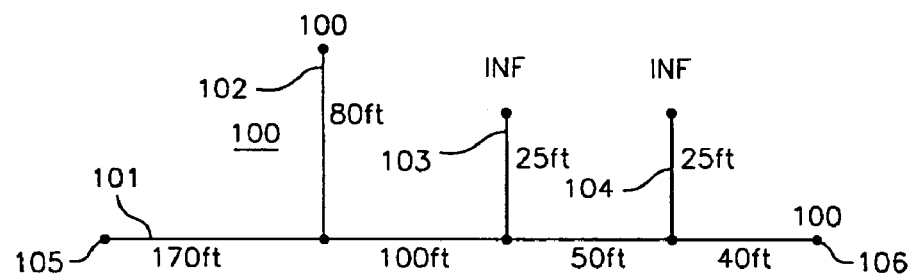
FIG. 1 shows typical pre-existing wiring used as a data communications network.
Figure 2:
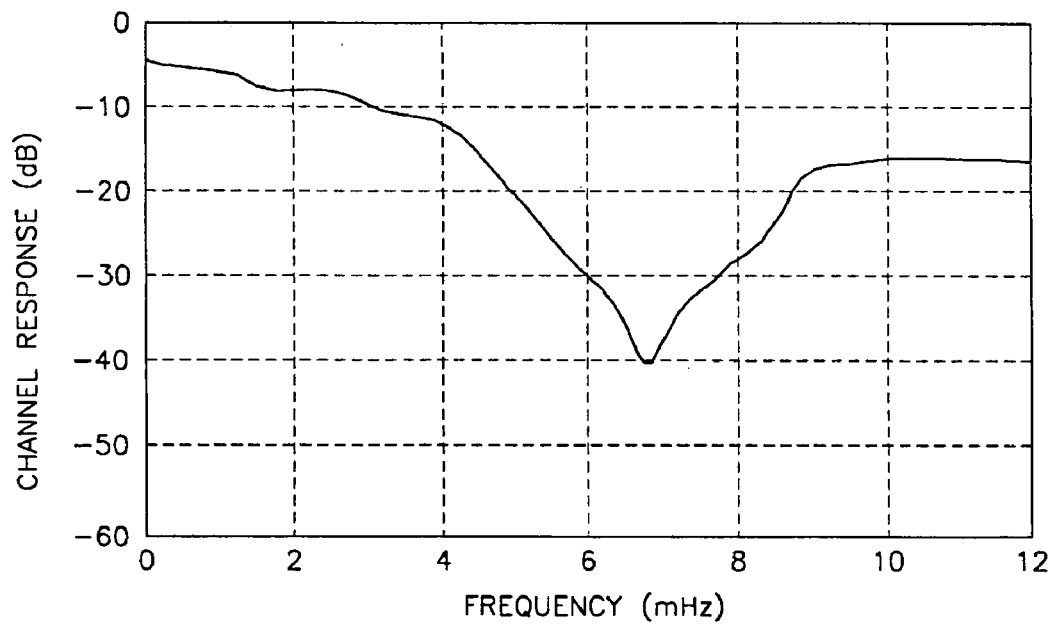
FIG. 2 shows the network frequency response of the network shown in FIG. 1.
Figure 7:
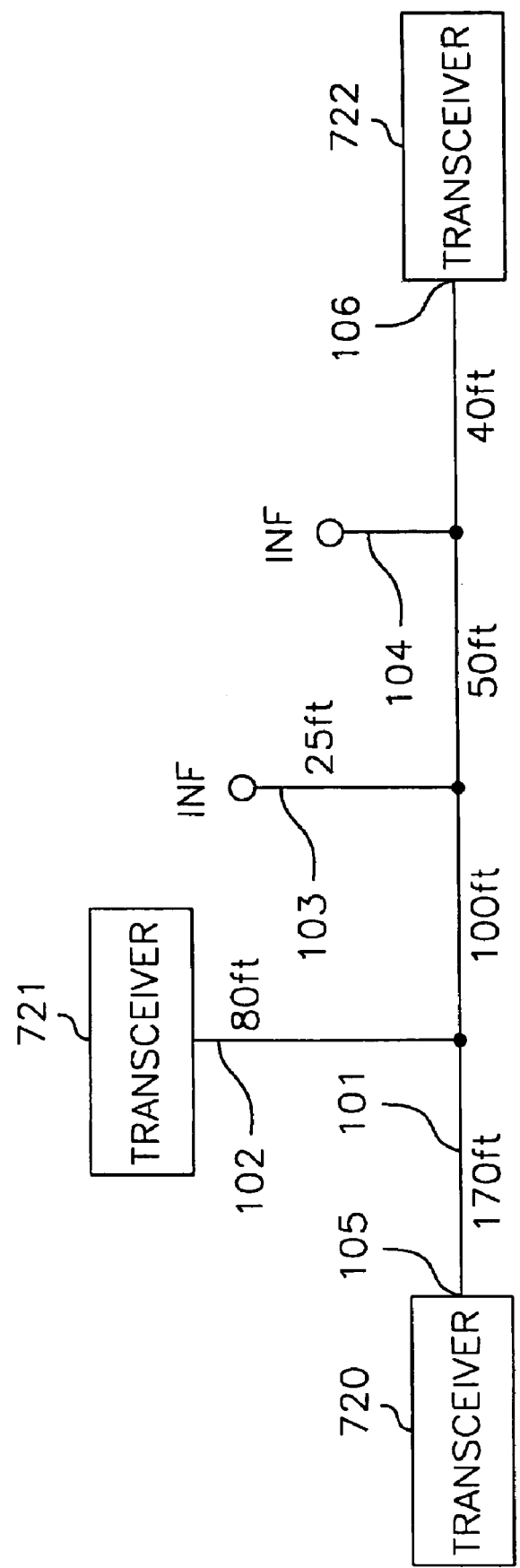
FIG. 7 shows a distributed network of transceivers according to the present invention.

FIG. 7 shows network 100 of FIG. 1 having transceivers 720, 721 and 722 according to the present invention. Transceiver 720 is coupled to the network at signal source 105, transceiver 721 is coupled to the network at the end of trunk line 102 away from main line 101, and transceiver 722 is coupled to the network at receiver terminator 106. In FIG. 7, any of transceivers 720, 721 and 722 can transmit data to any or all of the other transceivers 720, 721 and 722. In general, a network consists of multiple coupled transceivers. The transmission channel between any pair of transceivers depends on the signal path between the pair of transceivers. A packet-switched system for transmitting data between multiple transceivers in a network is described in U.S. patent application Ser. No. 09/037,357, "Off-line Broadband Network Interface", Eric Ojard et al., filed Mar. 9, 1998, and assigned to the same assignee as the present disclosure, herein incorporated by reference in its entirety.

Figure 8:
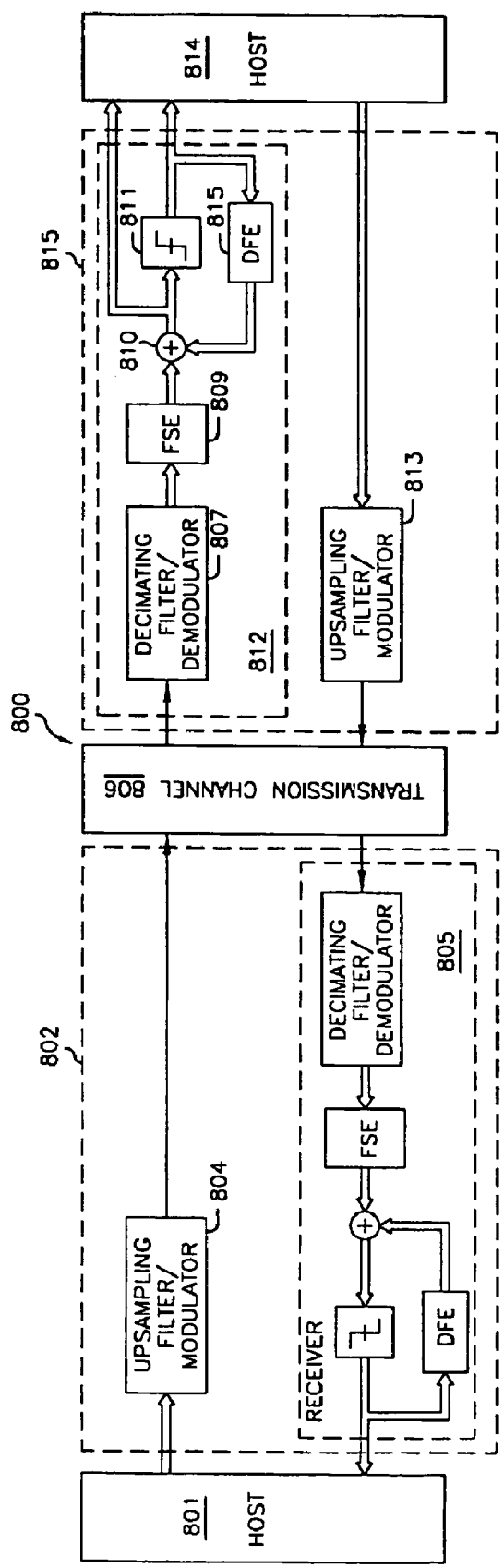
FIG. 8 shows a transceiver system according to the present invention.

FIG. 8 shows a transceiver system 800 according to the present invention. Transceiver system 800 represents any pair of transceivers in a network such as the one shown in FIG. 7. A host 801 is coupled to a single carrier transmitter 804 and a receiver 805. Transmitter 804 and receiver 805 are each coupled to transmission channel 806. Transmission channel 806 represents the channel in the network that couples transceiver 802 with transceiver 815. A host 814 is coupled to receiver 812 and transmitter 813, each of which are also coupled to transmission channel 806. Transceiver 802 includes upsampling filter/modulator 804. Receiver 812 includes decimating filter demodulator 807, fractionally spaced equalizer 809, and slicer 811. Hosts 801 and 814 are any devices, such as computer systems, that send and receive data through transceiver system 800.

Figure 9A:
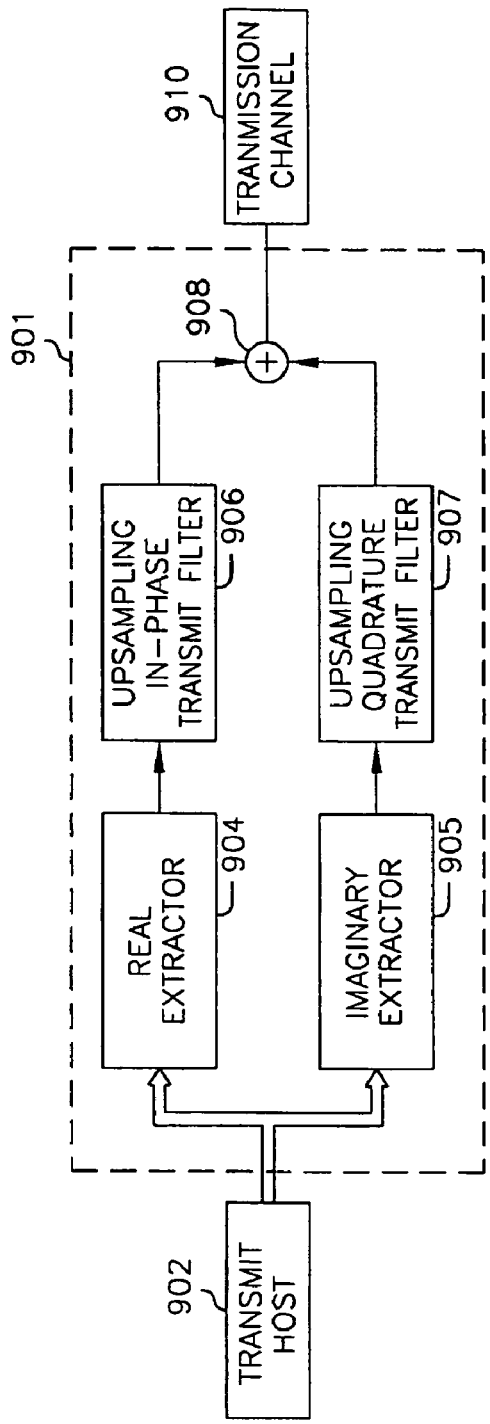
FIG. 9A shows a block diagram of a CAP transmitter.
Figure 10A:
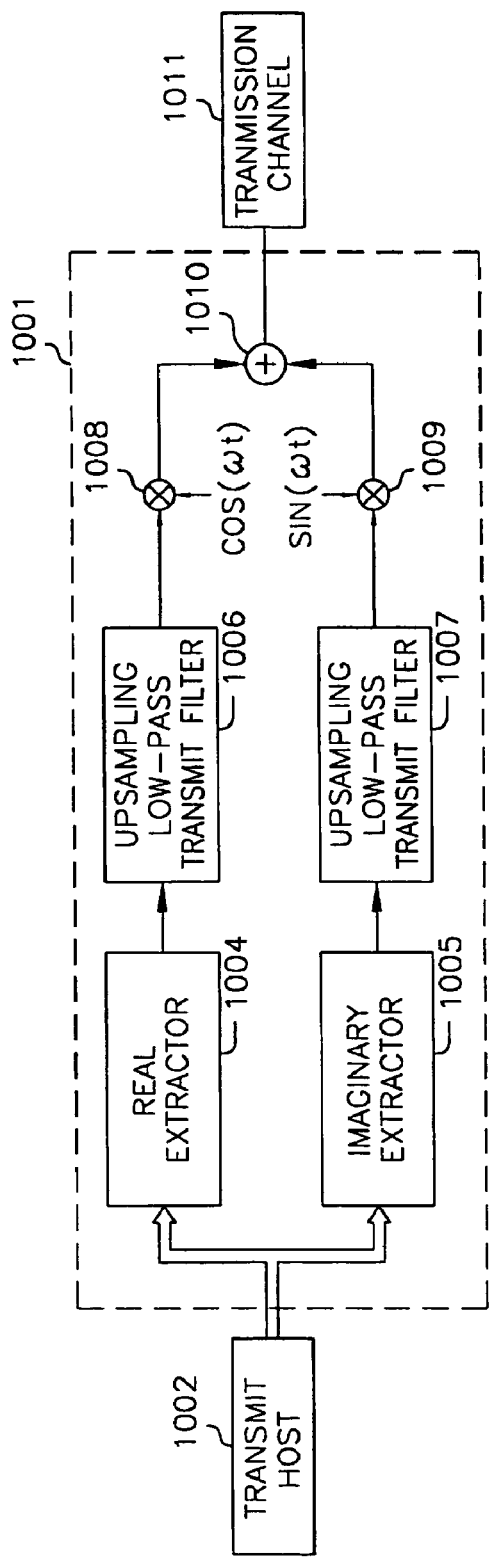
FIG. 10A shows a block diagram of a QAM transmitter.

Upsampling filter/modulator 804 receives a symbol stream from host 801, inserts k−1 null symbols between consecutive symbols of the symbol stream, and transmits the sample stream onto transmission channel 806. The parameter k represents the ratio between the output-sampling rate to the input sampling rate of upsampling filter/modulator 804. Upsampling filter/modulator 804 includes filtering, modulation of the output sample stream, and may include preprocessing of the sample stream (preceding) to remove intersymbol interference and other effects of transmission channel 806 on the signals. Transceiver 802 may use one of many modulation schemes in which to encode symbols, including quadrature amplitude modulation (QAM), Carrierless Amplitude-Phase Modulation (CAP), Phase Shift Keying (PSK) and Amplitude Phase Shift Keying (APSK). Transceiver 802 may also utilize other modulation schemes. An embodiment of filter/modulator 804 appropriate for CAP modulation is shown in FIG. 9A (see filter/modulator 901) and an embodiment of filter/modulator 804 appropriate for QAM modulation is shown in FIG. 10A (see filter/modulator 1001).

Figure 9B:
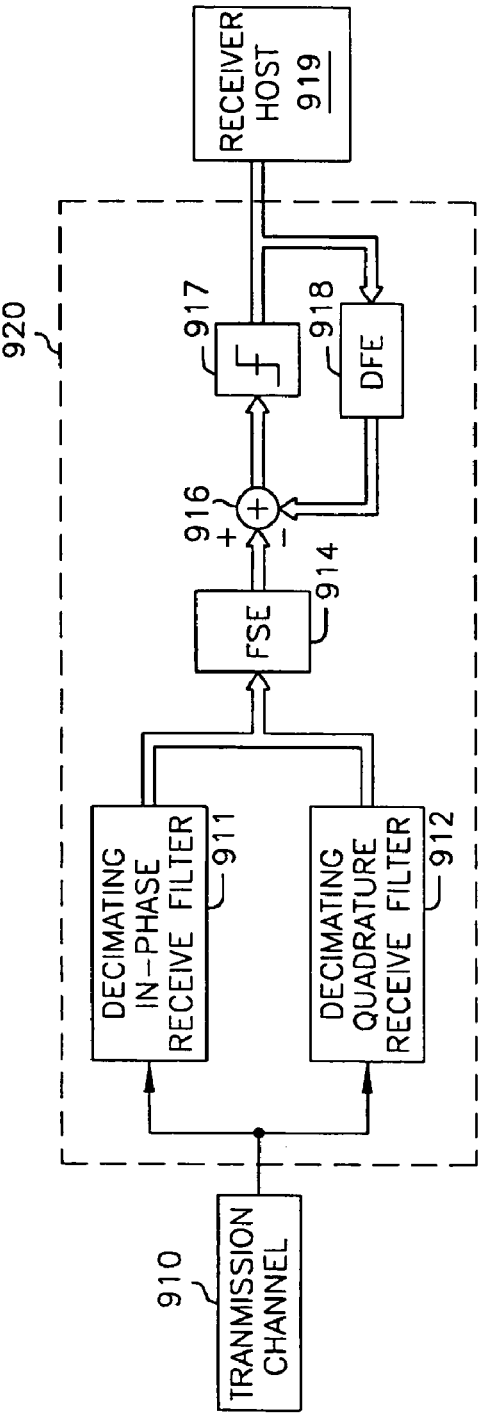
FIG. 9B shows a block diagram of a CAP receiver.
Figure 10B:
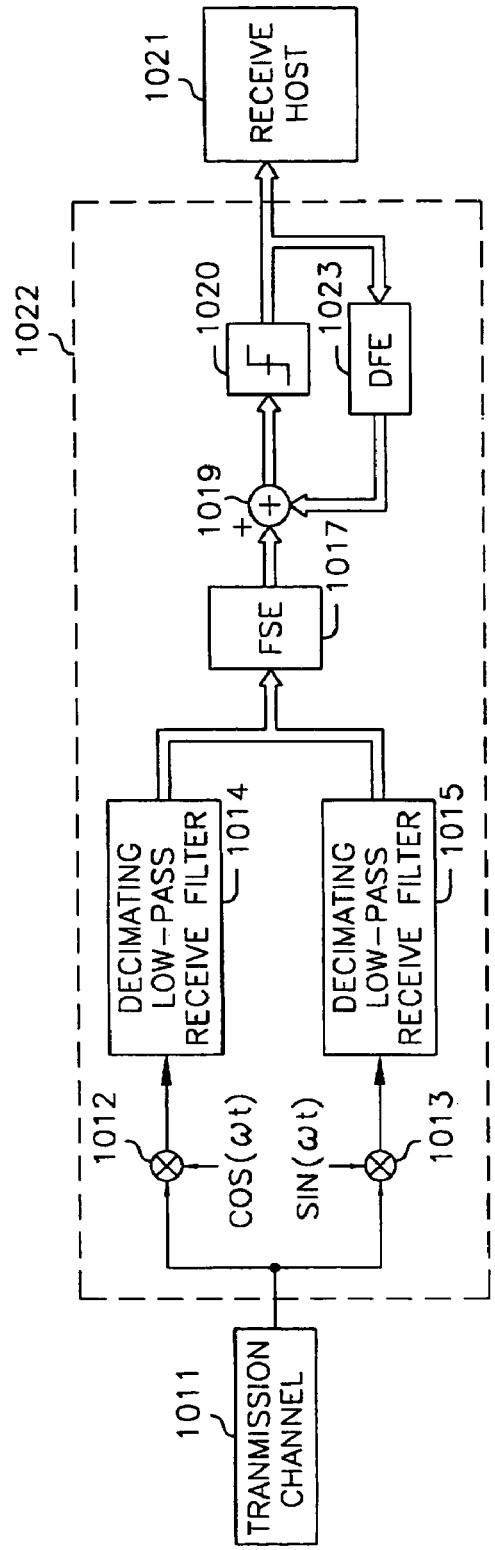
FIG. 10B shows a block diagram of a QAM receiver.

Decimating filter/demodulator 807 (FIG. 8) receives a sample stream from transmission channel 806. The sample stream received from transmission channel 806 is distorted with intersymbol interference due to the response of transmission channel 806. An embodiment of decimating filter/demodulator 807 appropriate for use with CAP modulation schemes is shown in FIG. 9B (filters 911 and 912) and an embodiment of decimating filter/demodulator 807 appropriate for use with QAM modulation schemes is shown in FIG. 10B (mixers 1012 and 1013 and filters 1014 and 1015). Decimating filter/demodulator 807 produces one (1) output sample for every k/L samples received. The ratio of the input sampling rate to the output sampling rate for decimating filter/demodulator 807, therefore, is k/L. In some embodiments, the input sampling rate of decimating filter/demodulator 807 differs from the output sampling rate of upsampling filter/modulator 802, in which case the ratio of the input sampling rate to the output sampling rate for decimating filter/demodulator 807 will differ from k/L.

Fractionally spaced equalizer (FSE) 809 equalizes the sample stream from decimating filter/demodulator 807. FSE 809 may be a linear time-invariant (LTI) finite-impulse-response (FIR) filter, although other structures may be used, including infinite-impulse response (IIR) filters and adaptive filters. FSE 809 produces one (1) output sample for every L input samples.

The sample stream, which now includes samples corresponding to the symbols transmitted by transceiver 802, are received in slicer 811. Slicer 811 may include further equalization structures, such as a symbol spaced decision feedback equalizer (DFE), and outputs a digitized symbol stream corresponding to a best-guess symbol stream based on the input signals received from transmission channel 806. In FIG. 8, the output samples from FSE 809 are received by adder 810, which subtracts the output sample stream for decision feedback equalizer (DFE) 815. DFE 815 receives the output symbols from slicer 811 and outputs samples that compensate the output samples from FSE 809 for intersymbol interference.

Host 814 inputs the symbol stream from slicer 811. In some embodiments of the invention, host 814 determines the applicability of the baud rate for transmission channel 806 based on an error analysis of the symbol sequence. In some embodiments, host 814 receives the sample stream that is input to slicer 811 in order to implement an error analysis. For example, receive host 814 can compute the mean-squared error (MSE) based on the difference between the input samples to slicer 811 (soft decisions) and the output symbols from slicer 811 (hard decisions). The MSE is then compared to a threshold value in order to determine whether or not the current baud rate is appropriate. Host 814 may then transmit a control signal to host 801 instructing it to change the baud rate. Other methods of determining the suitability of a baud rate (or adaptively choosing a baud rate) are also possible, such as measuring a bit error rate or frame error rate, or estimating the SNR based on a noise floor estimate and a channel estimate. In some embodiments, host 814 may test multiple baud rates in order to choose a baud rate that maximizes the net throughput (i.e., the product of the baud rate and the achievable bits per baud). Upsampling filter/modulator 813 and receiver 805 can have the same structures as upsampling filter/modulator 804 and receiver 812, respectively, although other structures can be used.

Figure 16:
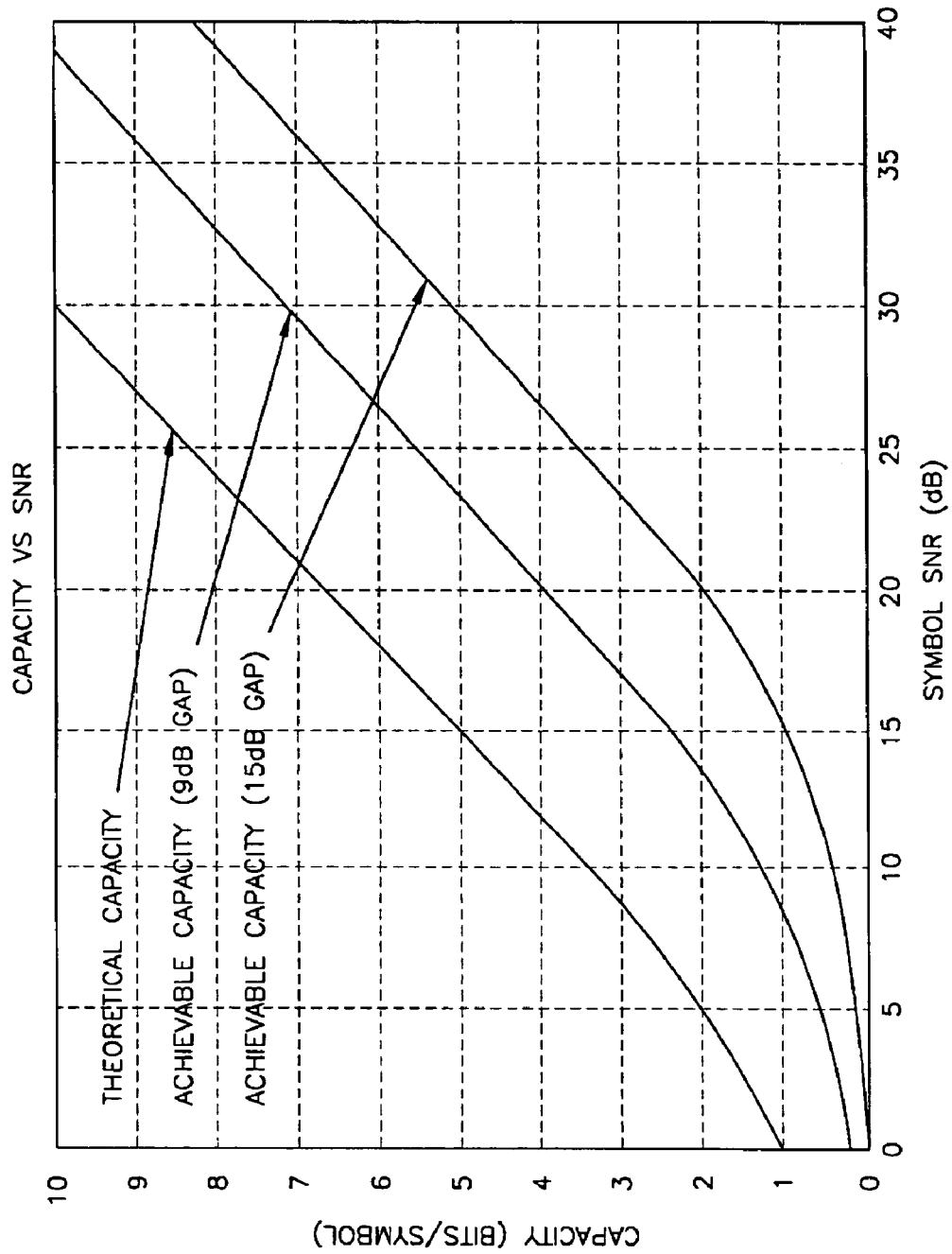
FIG. 16 shows the achievable channel capacity versus SNR and theoretical channel capacity versus SNR.

The achievable capacity of transmission channel 806 depends on the baud rate chosen by host 814. The theoretical channel capacity of transmission channel 806 is the theoretically maximum bit rate that can be transmitted through transmission channel 806. In real systems, there is a gap (measured in dB) between the achievable capacity of a channel and the theoretical capacity. A calculation of the theoretical capacity and the achievable capacity of a transceiver system is provided below. FIG. 16 shows a graph of the theoretical channel capacity versus SNR, the achievable channel capacity with a 9 dB gap, and the achievable channel capacity with a 15 dB gap versus SNR.

Passband Single-Carrier Modulation

According to the present invention transceivers, such as transceiver 800 (FIG. 8) is a single-carrier modulation transceiver. Passband single-carrier modulation schemes are attractive schemes for many transceiver applications due to their simplicity and flexibility. Passband systems are systems that do not include spectral components at or near D.C. (0 Hz) in the transmitted signal. Passband modulation is often needed because of poor transmission characteristics near D.C. or because the low-frequency spectrum is being used for something else (for example, to carry voice-band signals). The most common forms of passband single carrier modulation schemes are Carrierless Amplitude-Phase (CAP) modulation and Quadrature Amplitude Modulation (QAM). In this disclosure, single carrier modulation includes Carrierless Amplitude Phase modulation, which may be thought of as a single-carrier modulation scheme with a carrier frequency of zero, in order to distinguish CAP modulation from multi-carrier modulation schemes. Other varieties of single-carrier modulation schemes include Phase Shift Keying (PSK) and Amplitude Phase Shift Keying (APSK) schemes. The varieties of modulation schemes are differentiated by constellation type. The constellation refers to a plot, in the complex phase, of the symbols that constitute the symbol alphabet of the modulation scheme. Typically, CAP and QAM refer to symbol constellations that fall on a square grid, PSK constellations fall on a circle of constant magnitude, and APSK constellations fall on a non-uniform grid. All of the modulation schemes transmit a complex symbol sequence at a constant symbol baud rate.

Other modulation schemes will have different constellations. However, all of the modulation schemes can utilize the same transceiver structure. The respective receivers for QAM, PSK and APSK differ only in the decision device (slicer) used to interpret the received sample stream and the symbol alphabet used in the input symbol stream of the transmitter. CAP and QAM modulation schemes differ only in the mixers used to multiply the real and complex components of each symbol by a modulation signal in the QAM modulation scheme and in the response of the transmit filters.

FIG. 9A shows an example of a CAP transmitter 901. A host system 902 sends a symbol stream to transmitter 901. Each symbol in the symbol stream represents a unit of data (for example, a number of bits) and is dependent on the symbol alphabet, or modulation scheme, that is used for the transmission of data. For example, a 16-point CAP constellation encodes 4 bits of data per symbol. There are many other symbol alphabet schemes that can be used to transmit data. In general, a symbol represents a number of bits of data and includes a real and an imaginary part (i.e., a symbol A is a+bj, where a is the real portion and b is the imaginary portion of the symbol).

Each symbol in the symbol stream outputted by transmit host 902 is separated into its real and imaginary parts in real extractor 904 and imaginary extractor 905, respectively. The real portion of the sample stream is received by upsampling in-phase transmit filter 906. The imaginary portion of the symbol stream is received in upsampling quadrature transmit filter 907. Upsampling in-phase transmit filter 906 and upsampling quadrature transmit filter 907 are band-pass filters arranged to have the same magnitude response and to operate 90°. out of phase with respect to one another. The pass band of filters 906 and 907 can be conventionally chosen. Filters 906 and 907 define the output power spectrum of transmitter 901.

Upsampling in-phase transmit filter 906 and upsampling quadrature transmit filter 907 also insert k−1 null samples between incoming symbols of the received symbol stream. The value of k is the ratio of the sampling rate to the symbol (baud) rate. A typical single-carrier system might have k=4, but k depends on other system parameters. In general, k is chosen so that the sampling rate is greater than the Nyquist frequency. The combined symbols with intermixed null samples is referred to as a sample stream.

The output signal from upsampling quadrature transmit filter 907 is subtracted from the output signal from upsampling in-phase transmit filter 906 in adder 908 and is then transmitted to transmission channel 910. Transmission channel 910 may take a variety of forms, but in many business and homes metallic wiring is used. A transceiver transmission channel 10 according to the present invention can use the pre-existing household wiring. Transmission channel 10, along with transmitter filters 906 and 907 and filters in the receiver, introduces significant distortion into the sample stream from transmitter 901, as was discussed above. This distortion is typically corrected in the receiver. In some systems, transmitter 901 includes precoding of the sample stream in order to counter the effects of the distortion.

FIG. 9B shows a CAP receiver 920. Signals from transmission channel 910 are received into decimating in-phase receive filter 911 and decimating quadrature receive filter 912. Decimating in-phase receive filter 911 is arranged to receive the real portion of the sample stream from transmission channel 910 and quadrature receive filter 912 is arranged to receive the imaginary portion of the sample stream from transmission channel 910. Decimating in-phase receive filter 911 and decimating quadrature receive filter 912 produce one (1) output sample for every k/L input samples. The ratio of the sampling rate of decimating in-phase receive filter 911 and decimating quadrature receive filter 912 to the output sampling rate, therefore, is k/L.

The combined real and imaginary parts of the sample stream, i.e. the output signals from decimating in-phase receive filter 911 and decimating quadrature receive filter 912, is received in fractionally spaced equalizer (FSE) 914. FSE 914 is a linear equalizer designed to compensate for channel distortion and intersymbol interference caused by transmission channel 910 and the transmit and receive filters. Fractionally spaced equalizer 914 produces one output sample for every L input samples. The parameter L, then, is the ratio of the input sampling rate to the symbol baud rate at FSE 614, where L>1. In a typical system, L may be set to 2, although other values could be used, including non-integers. Using a fractionally-spaced equalizer enables filtering of the band-edges, enabling optimal matched-filter performance. (See E. LEE AND D. MESSERCHMITT, DIGITAL COMMUNICATIONS, 331 (1988)). The output samples from FSE 914 often are further equalized with a decision feedback equalizer (DFE) 918. DFE 918 receives the output symbols from slicer 917 and outputs a sample stream that is subtracted from the output samples from FSE 914 in adder 916. The output samples from adder 916 are received by slicer 917, which determines the output symbol stream based on the input samples. Slicer 917 interprets the sample stream in accordance with the modulation scheme utilized by the transceiver.

A QAM transceiver operates in a similar fashion to a CAP transceiver. The equalization is arranged to correct a substantially similar distortion as in the CAP transceiver shown in FIGS. 9A and 9B and therefore the equalizer structures are substantially the same. The major difference between a CAP transceiver and a QAM transceiver is that in the QAM transceiver there is a modulation by a carrier frequency following the transmit filters and a corresponding demodulation by the carrier frequency preceding the receive filters. CAP transceivers and QAM transceivers have equivalent performance and may have substantially similar implementations.

FIG. 10A shows a QAM transmitter 1001. Transmit host 1002 outputs a symbol stream to QAM transmitter 1001. The real portion of the sample stream is separated by real extractor 1004 and filtered with upsampling low-pass transmit filter 1006. Upsampling low pass transmit filter 1006 also inserts k−1 null samples between incoming symbols of the received symbol stream. The value of k is the ratio of the sampling rate to the symbol (baud) rate. The output signal from upsampling low-pass transmit filter 1006 is modulated in mixer 1008 by, for example, multiplying it with a cos(ωt) function. The imaginary portion of the sample stream is separated by imaginary extractor 1005, filtered in upsampling low-pass transmit filter 1007, and modulated in mixer 1009 with a sin(ωt) function. Upsampling low-pass transmit filter 1007 also inserts k−1 null samples between incoming symbols of the received symbol stream. The output signal from mixer 1008 is added to the output signal from mixer 1009 and coupled to transmission channel 1011.

FIG. 10B shows a receiver 1022 coupled to receive signals from transmission channel 1011. The signal from transmission channel 1011 is mixed with a cos(ωt) in mixer 1012 and filtered in decimating low-pass receive filter 1014. The signal from transmission channel 1011 is also mixed with a sin(ωt) function in mixer 1013 and filtered in decimating low-pass receive filter 1015. Decimating low-pass receive filter 1014 and decimating low-pass receive filter 1015 produce one output sample for every k/L input samples. The combined output signals (i.e., both the real and the imaginary parts of the samples) from decimation low-pass receive filters 1014 and 1015 are received in fractionally spaced equalizer 1017 for equalization. Fractionally spaced equalizer 1017 produces one output sample for every L input samples. Receiver 1022 also includes a decision feedback equalizer (DFE) 1023 for removing the effects of intersymbol interference and other channel distortions from the sample stream. DFE 1023 receives output signals from slicer 1020 and outputs a sample that is a function of past decided upon symbols, which is subtracted from the sample stream in adder 1019. The output sample stream from adder 1019 is received by slicer 1020, which decides on the output symbol stream based on the sample stream from adder 1019.

Frequency-Diverse Single Carrier Modulation

According to the present invention, transceivers such as transceiver 800 (FIG. 8) achieve robust performance over transmission channels with large unusable spectral regions by using a baud rate whose value is less than or equal to half of the spectral bandwidth of the transmitted signal, introducing spectral redundancy. The amount of redundancy increases as the baud rate decreases. Transceivers, therefore, can achieve robust performance over channels with deep wide spectral nulls, such as that shown in FIG. 4, without requiring detailed knowledge by the transmitter of the transmission channel.

In order to better describe embodiments of the invention, the spectral bandwidth of the transmitted signal needs to be precisely defined. Any signal or filter of limited time-duration has infinite bandwidth, so a precise definition of the spectral bandwidth must rely on thresholds. Although other threshold values could have been chosen, it is convenient to choose a threshold of 10 dB below the average power spectral density (PSD) of the passband power spectrum indicating a decrease in PSD of one order of magnitude. A spectral region with a PSD below this threshold is far less useful for carrying information. For any given PSD and baud rate 1/T, the spectral bandwidth can be determined. In this disclosure, the nominal PSD is defined as the maximum average PSD over any contiguous spectral region of bandwidth 1/T, therefore $$PSD_{nom} = \max_{fc}\left(T\int_{fc-\frac{1}{2T}}^{fc+\frac{1}{2T}} S(f)\,df\right),$$

where $\max_x$ (f(x)) denotes the maximum value of f(x) over all possible values of x and S(f) is the PSD of the transmitted signal.

The lower band-edge frequency can be defined as the highest frequency below which the PSD is always at least 10 db below the nominal PSD. Likewise, the upper-band-edge frequency is the lowest frequency above which the PSD is always at least 10 dB below the nominal PSD. The spectral bandwidth, then, is the upper band-edge frequency minus the lower band-edge frequency. Embodiments of this invention use a baud rate that is less than half the spectral bandwidth of the transmitted signal. Single-carrier modulation schemes that meet this criterion may be considered frequency-diverse.

Figure 11:
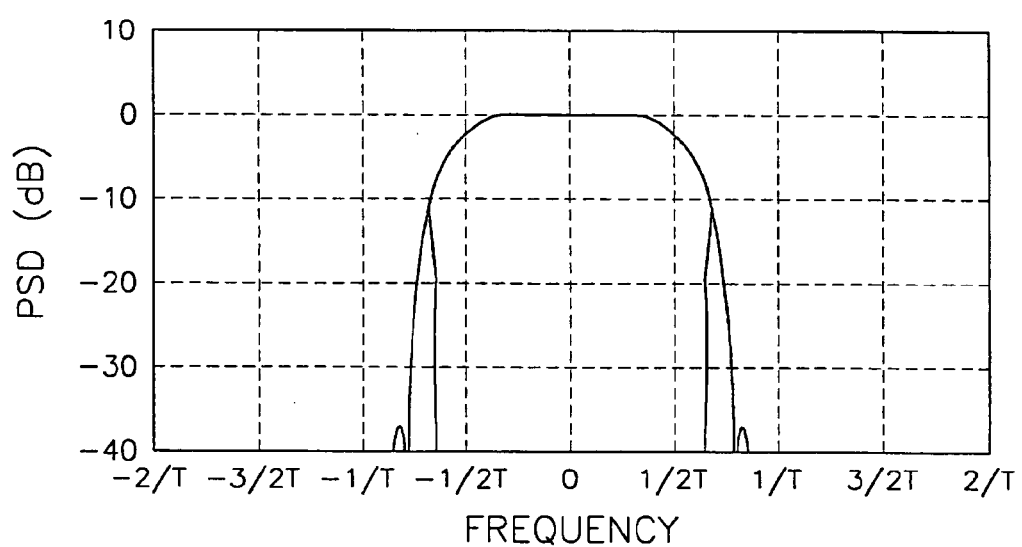
FIG. 11 shows a power spectral density of a 50% excess-bandwidth square-root raised cosine pulse.

FIG. 11 shows a square-root raised cosine pulse, S(f), with 50% excess bandwidth. The graph is normalized such that the nominal PSD of the transmitted signal is 0 dB. The two vertical lines in FIG. 11 indicate the lower band-edge frequency and upper band-edge frequency, as defined above. Clearly, the baud rate 1/T shown in FIG. 11 is not less than half the spectral bandwidth as defined above, so this does not meet the criteria for being frequency diverse. However, this could be made frequency-diverse by decreasing the baud rate such that the criteria is met.

FIGS. 12A-C show spectra of data being sent through a traditional (non-frequency-diverse) CAP transmitter (as illustrated in FIG. 9A) or a QAM transmitter (as illustrated in FIG. 10A) with carrier frequency 1/T. FIG. 12A shows the base-band spectrum for a short complex data sequence at the baud-rate 1/T. The dotted line shows the spectrum of the same signal upsampled with zeros inserted between each symbol, which would occur in upsampling filters 906 and 907 of CAP transmitter 901 (FIG. 9A) or upsampling filters 1006 or 1007 of QAM transmitter 1001 (FIG. 10A). Note that in FIG. 12A the base-band spectrum repeats every 1/T. FIG. 12B shows the power spectrum of the transmit filter (filters 906 and 907 (FIG. 9A) or filters 1006 and 1007 (FIG. 10A) shifted up in frequency by 1/T. FIG. 12c shows the resulting power spectrum of the signal transmitted from the transmitter.

Figure 13A:
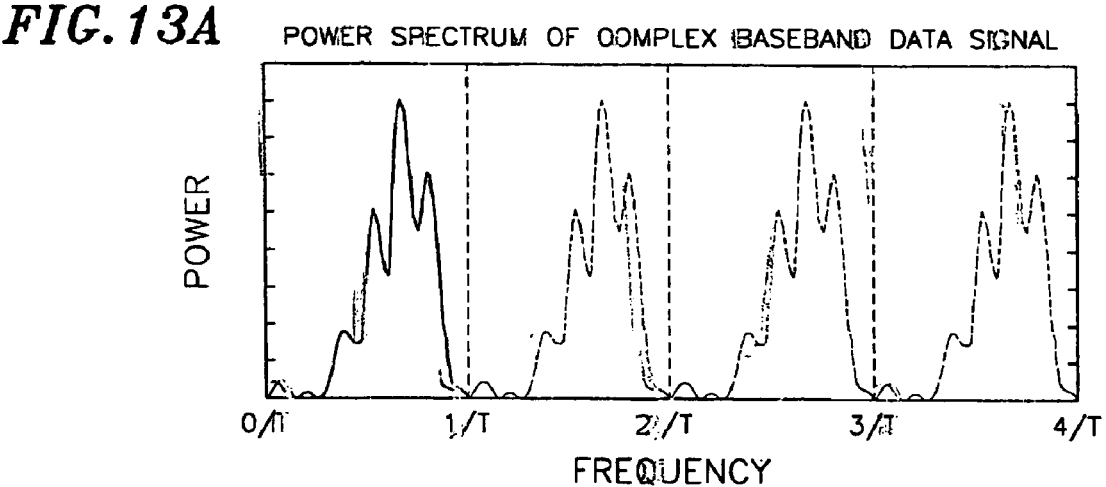
FIGS. 13A through 13C show power spectra of a short complex data burst as it is transmitted through a CAP or QAM transceiver system according to the present invention.
Figure 13B:
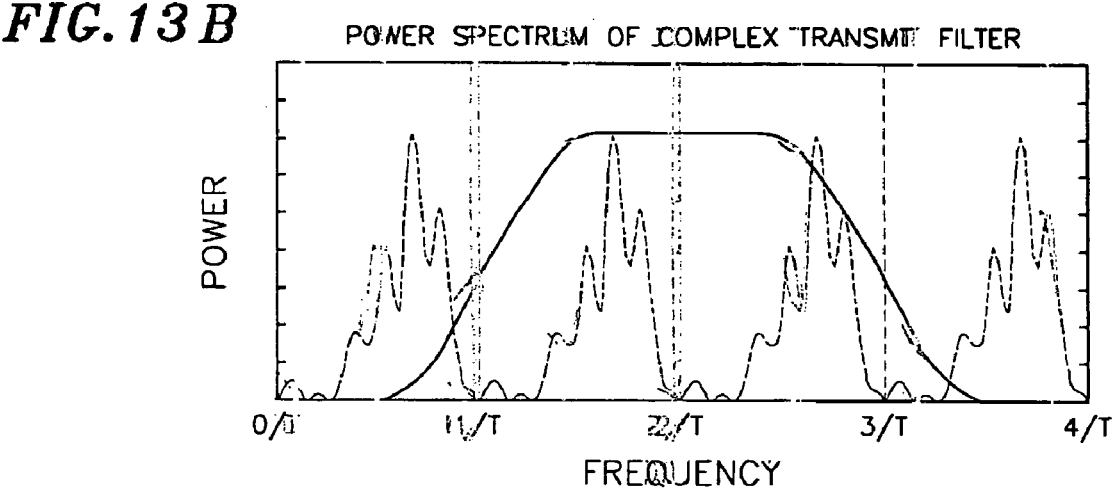
Figure 13C:
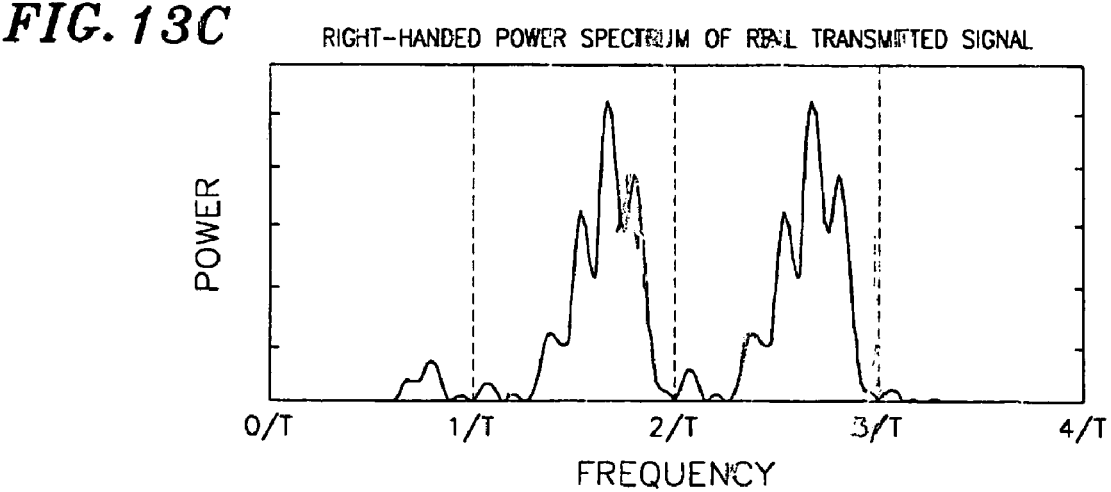

As is illustrated in FIGS. 12A through 12C, when the data sequence is passed through a transmit filter, most of the redundant spectral information is filtered out. Each spectral region of the base-band signal is sent substantially at only one frequency in the transmitted signal. Using a higher excess bandwidth pulse (e.g. 100%) would provide some spectral redundancy, but not all parts of the spectrum would be repeated at a usable signal level. In contrast to the situation shown in FIGS. 12A-12C, FIGS. 13A-13C illustrate frequency diverse CAP/QAM according to the present invention (transmitter 901 or transmitter 1001, for example). FIG. 13A again shows the base-band power spectral density of a short complex data sequence at a baud rate of 1/T along with the upsampled spectra (represented by dotted lines) that results from upsampling and zero-filling that occurs in transmit filters such as filters 906 and 907 of CAP transmitter 901 (FIG. 9A) or filters 1006 and 1007 of QAM transmitter 1001 (FIG. 10A). FIG. 13B shows the spectral response of the transmit filter. The spectral response of the transmit filter shown in FIG. 13B is identical with the spectral response of the transmit filter shown in FIG. 12B. However, the signal is sampled at twice the rate relative to the baud rate 1/T (or the baud rate 1/T shown in FIGS. 13A through 13B is half the baud rate shown in FIGS. 12A through 12B). FIG. 13C shows the resulting transmittal signal. Each spectral region of the baseband spectrum is transmitted at two different frequencies, creating spectral diversity. Lowering the baud rate 1/T results in further frequency diversity with each spectral region transmitted into frequencies separated by integer multiples of the baud rate. Additionally, increasing the bandwidth of the transmit filters will also increase the frequency diversity. Although the above example has been illustrated with respect to the CAP transmitter of FIG. 9A and the QAM transmitter of FIG. 10A, the invention is applicable to any single-carrier transceiver system.

Conceptually, the benefits of passband single-carrier frequency-diverse modulation are similar to those of traditional frequency-diversity. If part of the frequency band is unusable, resulting in loss of information, it is likely that the same spectral information will be received in a different part of the spectrum, assuming that the typical notch width of any unusable spectral region is less than 1/T. Unlike traditional frequency-diversity, however, this method does not require multiple carrier frequencies in the transmitter or multiple demodulators in the receiver. The signal may be processed optimally with substantially the same receiver structure as a traditional passband CAP or QAM system, such as those shown in FIGS. 9B and 10B, making it ideal for systems in which a non-frequency diverse mode is desired for higher rate operation under better channel conditions. Compared to traditional single-carrier modulation, the obvious penalty of frequency-diverse single carrier modulation is a reduction in symbol rate for a given transmit PSD. However, the achievable bit rate may actually increase under certain channel conditions, as will be shown.

Receiver 812 (FIG. 8) of transceiver 800 processes the full spectral bandwidth of the signal using fractionally spaced equalizer 809, which is capable of combining the different spectral regions in an optimal manner. The coefficients of FSE 809 and DFE 815 may be trained adaptively in order to optimize performance under different channel conditions, and to compensate for the different channel responses between each source-destination pair. Typically, each data transmission can include a known training sequence for training of the equalizers. The equalizers could be trained for optimal performance using any of a number of well-known techniques (See SIMON HAYKIN, ADAPTIVE FILTER THEORY (3rd ed. 1996)). Thus, the benefits of frequency diversity are realized using a single-carrier transceiver structure.

Figure 4:
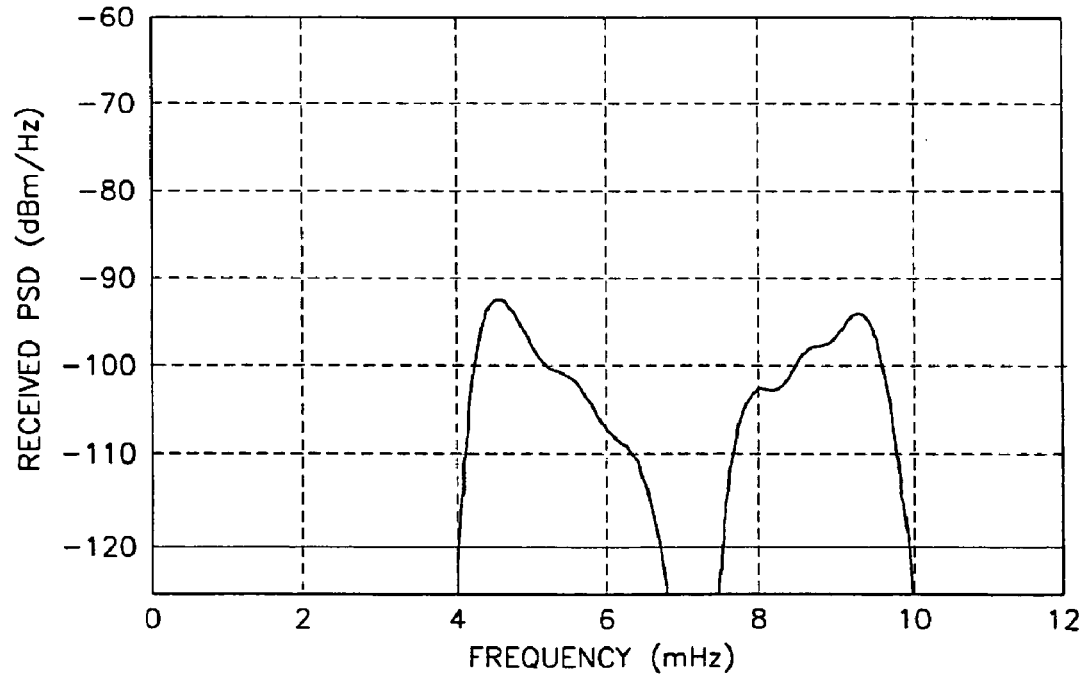
FIG. 4 shows the combined frequency response of the network as shown in FIGS. 1 and 2 and the transmit and receiver filters as shown in FIG. 3.
Figure 5A:
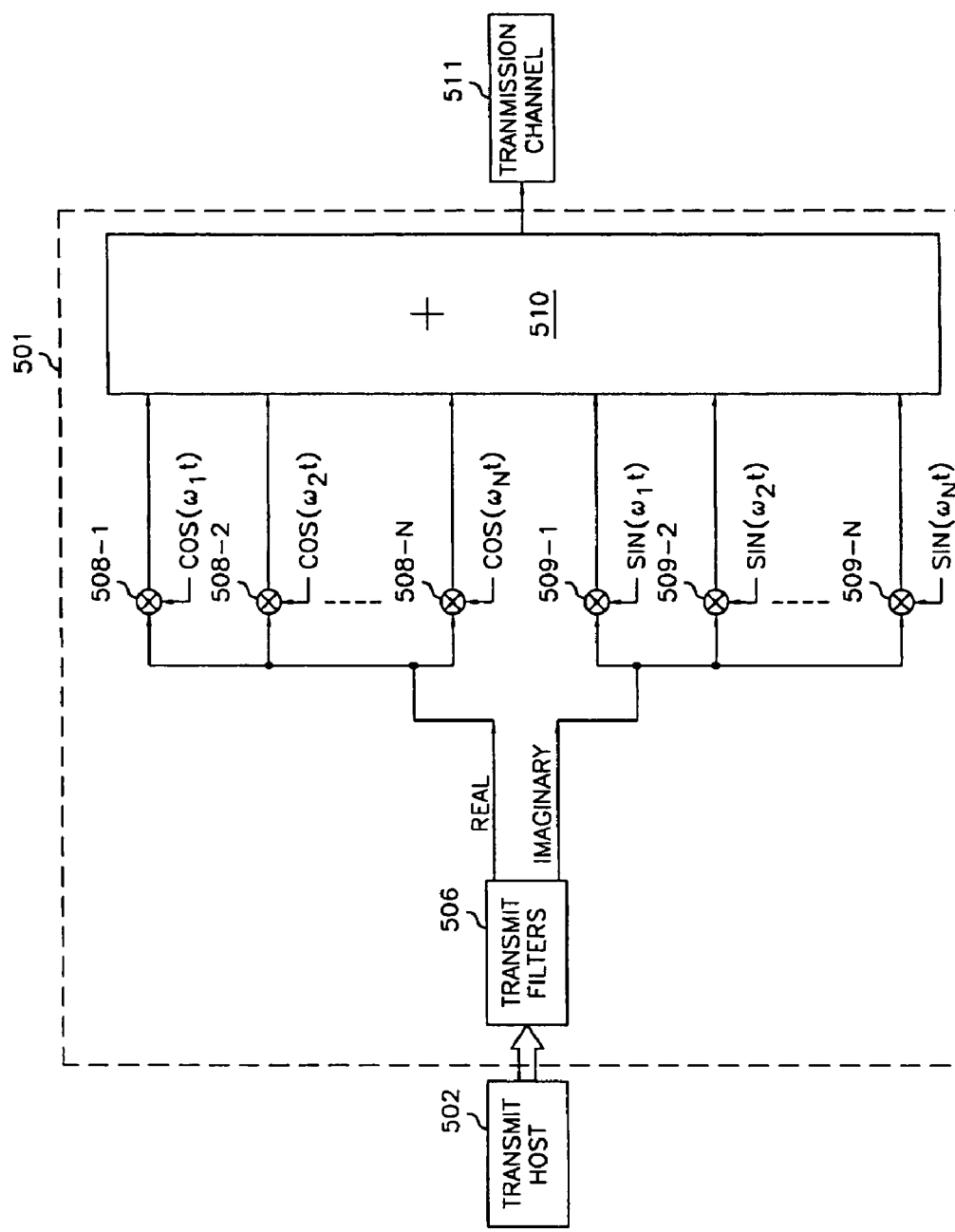
FIG. 5A shows a frequency-diverse QAM transmitter for transmitting a symbol stream using several frequency bands.
Figure 5B:
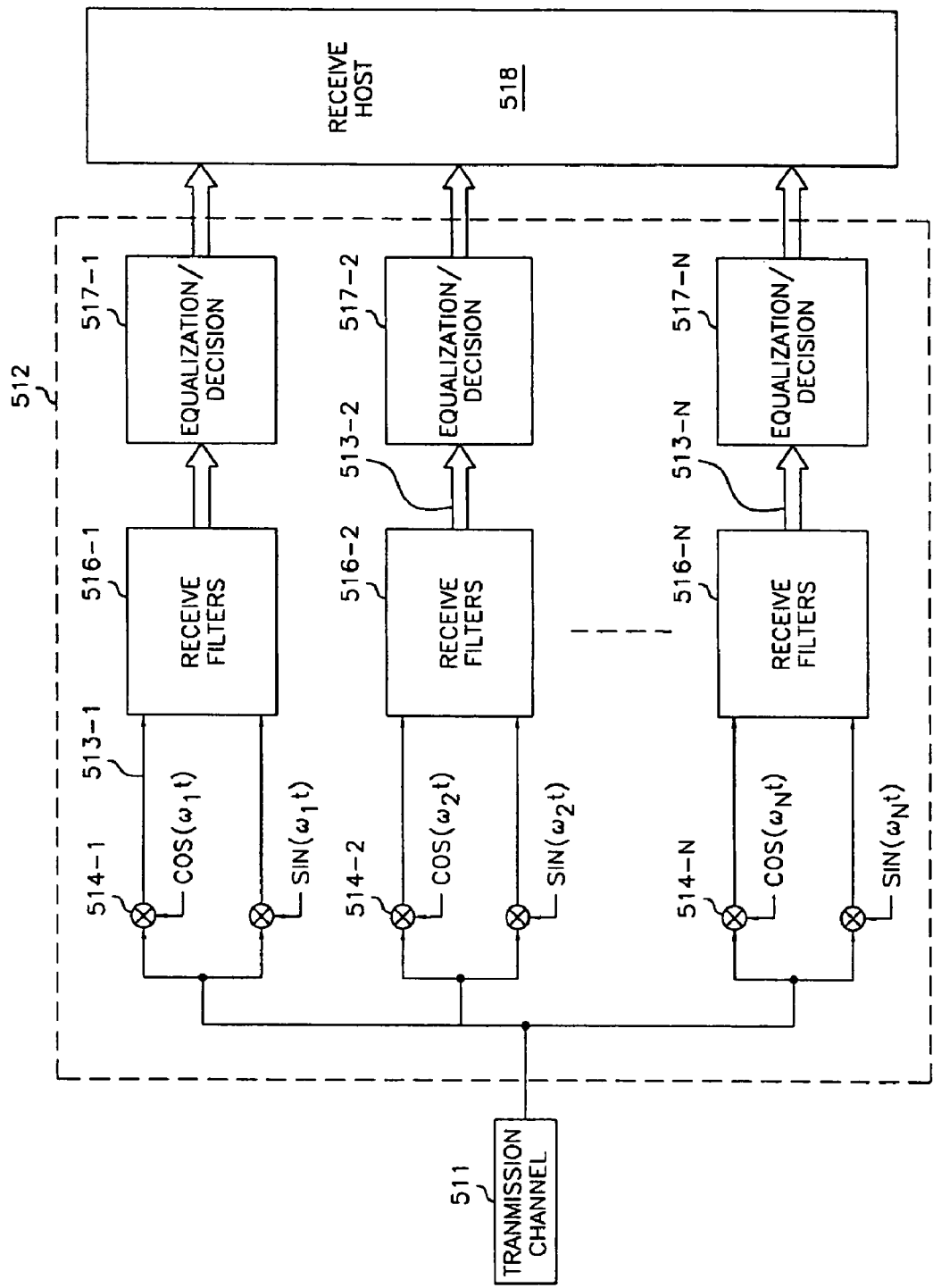
FIG. 5B shows a frequency-diverse QAM receiver for receiving and processing symbols that are transmitted simultaneously over several bands.
Figure 6A:
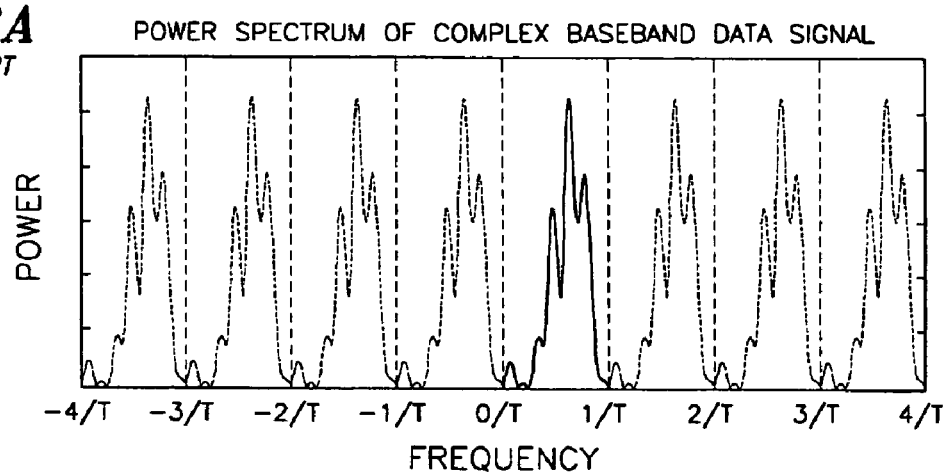
FIGS. 6A, 6B and 6C show power spectra of data transmitted in a frequency diverse system such as that shown in FIGS. 5A and 5B.
Figure 6B:
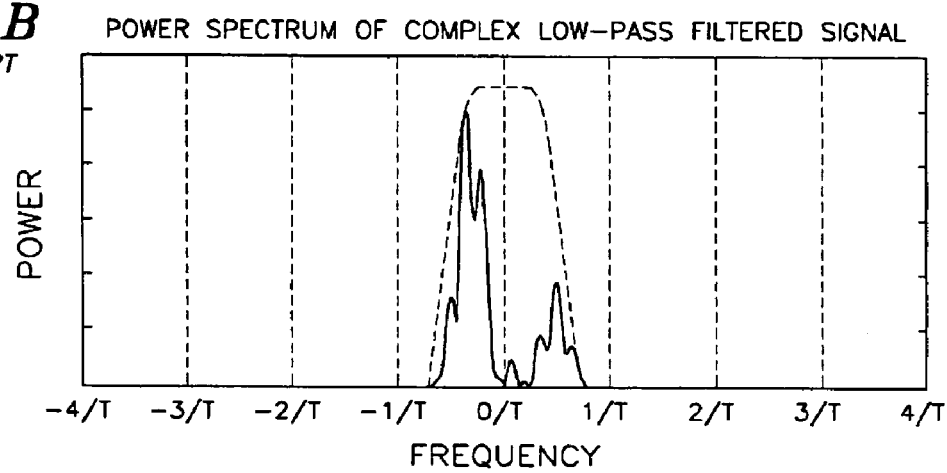
Figure 6C:
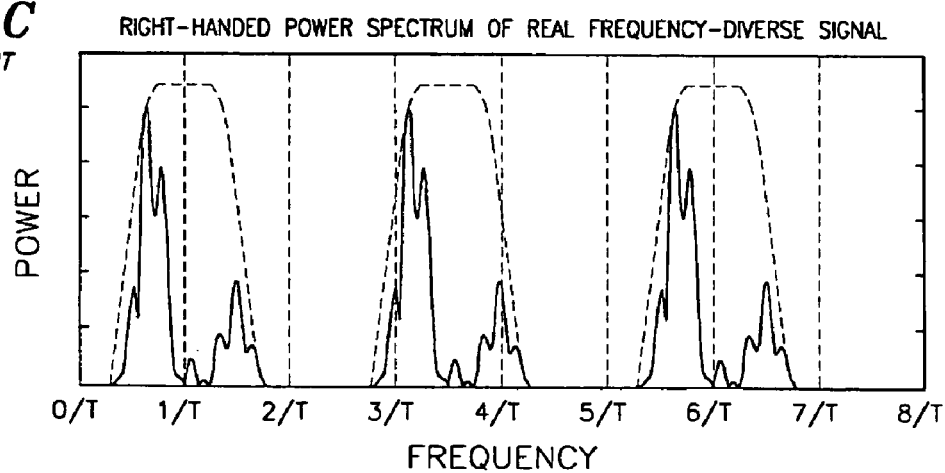
Figure 14:
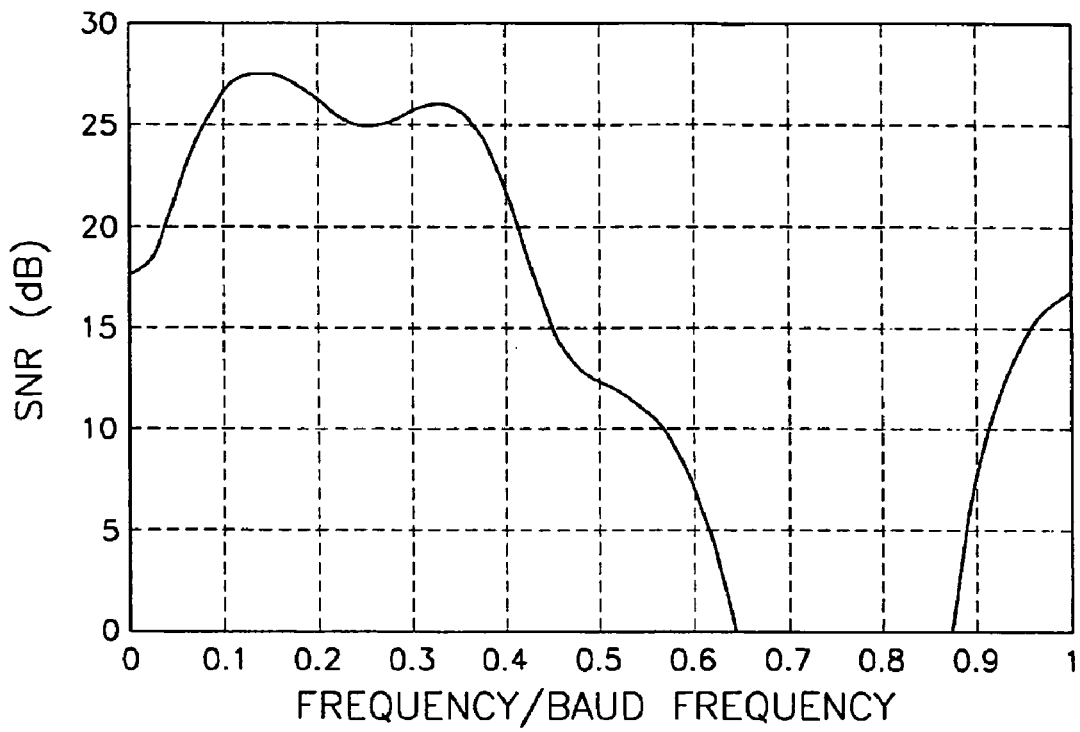
FIG. 14 shows the folded spectrum for the transmission channel of FIG. 4 with a symbol baud rate of 4 MHz.
Figure 15:
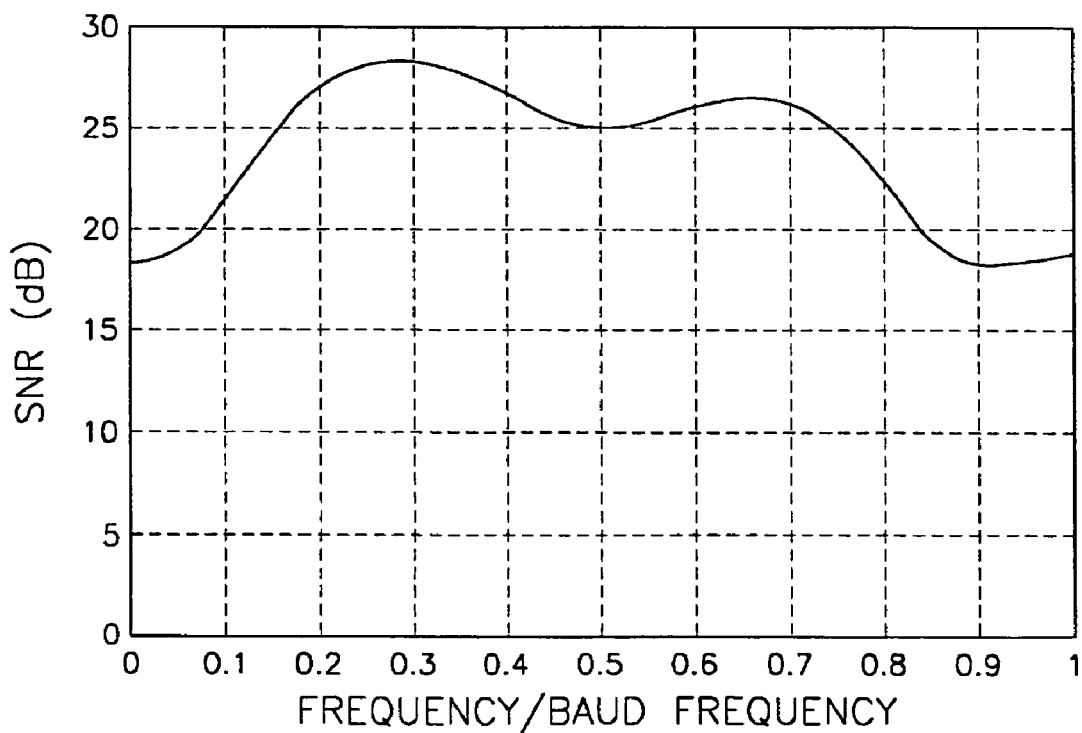
FIG. 15 shows the folded spectrum for the transmission channel shown in FIG. 4 and a symbol baud rate of 2 Mhz.

The benefits of this method are illustrated in the following realistic example. FIG. 4 shows the combined channel response of the example network shown in FIG. 1, with large unusable spectral regions due to RFI filters and reflections from unterminated bridged taps. With a baud rate of 4 Mhz, lower band edge at 4 Mhz and upper band edge at 10 Mhz, this signal is not frequency-diverse as defined above. FIG. 14 shows the folded power spectrum of the channel response shown in FIG. 4 at a baud rate of 4 MHz. (See below for a description of the folded power spectrum and the calculation of the optimal slicer SNR). The folded spectrum shown in FIG. 14 has deep spectral nulls where the spectrum is at or below the noise floor. The optimal slicer SNR is $SNR_{OPT}$=14.7 dB. Assuming a gap of .GAMMA.=15 dB (9 dB coding gap plus 6 dB combined margin and implementation loss), the achievable capacity using integer bits per symbol is zero, so no data can be reliably transmitted. However, at a baud rate of 2 Mhz, using the same transmitted PSD, the transmitted signal is frequency diverse, and reliable operation is possible. FIG. 15 shows the folded power spectrum of the channel response shown in FIG. 4 for a baud rate of 2 Mhz. The folded power spectrum contains no spectral nulls and the optimal slicer SNR is $SNR_{OPT}$=23.9 dB. Again, assuming a gap of .GAMMA.=15 dB, the resulting achievable capacity is 3 bits per symbol or 6 Mbps. The folded spectra shown in FIGS. 14 and 15 is achieved by transceiver 800 shown in FIG. 8 by selecting baud rates of 4 Mhz and 2 Mhz, respectively, and setting L=2 and L=4, respectively with k=8 and k=16, respectively.

Accordingly, frequency-diverse single-carrier passband modulation in accordance with one embodiment of the present invention enables robust operation on channels too severe for full baud-rate single-carrier modulation (e.g., due to deep spectral notches and low SNR) and is less complex than traditional frequency-diverse modulation. Moreover, using frequency-diverse single-carrier passband modulation, all adaptation (other than rate adaptation) can occur at receiver 812, unlike multicarrier modulation. Use of a frequency-diverse single-carrier passband modulation scheme can increase the usable SNR range several dB over traditional full-baud rate single-carrier modulation.

In one embodiment of the invention, the baud rate and the value of L for the fractionally spaced equalizer of the receiver are fixed. In other embodiments, the baud rate is adaptively chosen to maximize the error-free throughput of the channel. In these embodiments, the baud rate is communicated between the transmitter and the receiver by a parallel transceiver system. Typically, the same transmit filter is used for the different baud rates, so the amount of spectral redundancy increases as the baud rate decreases. In one embodiment of the adaptively chosen system, the transceiver starts at a minimum baud rate and then moves to faster baud rates if the transmission channel permits. In some embodiments, the transceiver can test several baud rates before an acceptable baud rate is chosen. In another embodiment of the adaptively chosen system, the transceiver can default to use of the maximum available baud rate and resorts to baud rates of less than half the spectral bandwidth of the transmitted signal in situations where the bit error rate becomes excessive.

In one embodiment of the invention, critical control information and other high priority error-sensitive data are sent at a low baud rate while less error sensitive data is sent at a high baud rate. Reliable transmission of critical data can be obtained while allowing a higher baud rate for less sensitive data.

Theoretical and Achievable Channel Capacity

The theoretical channel capacity is the theoretical limit on the rate that data can be transmitted error-free across a channel. See J. M. Cioffi, et al., MMSE Decision-Feedback Equalizers and Coding—Part I: Equalization Results and Part II: Coding Results, IEEE TRANS. COMM., vol. 43, no. 10, p. 2582-2604, October 1995.

Figure 3:
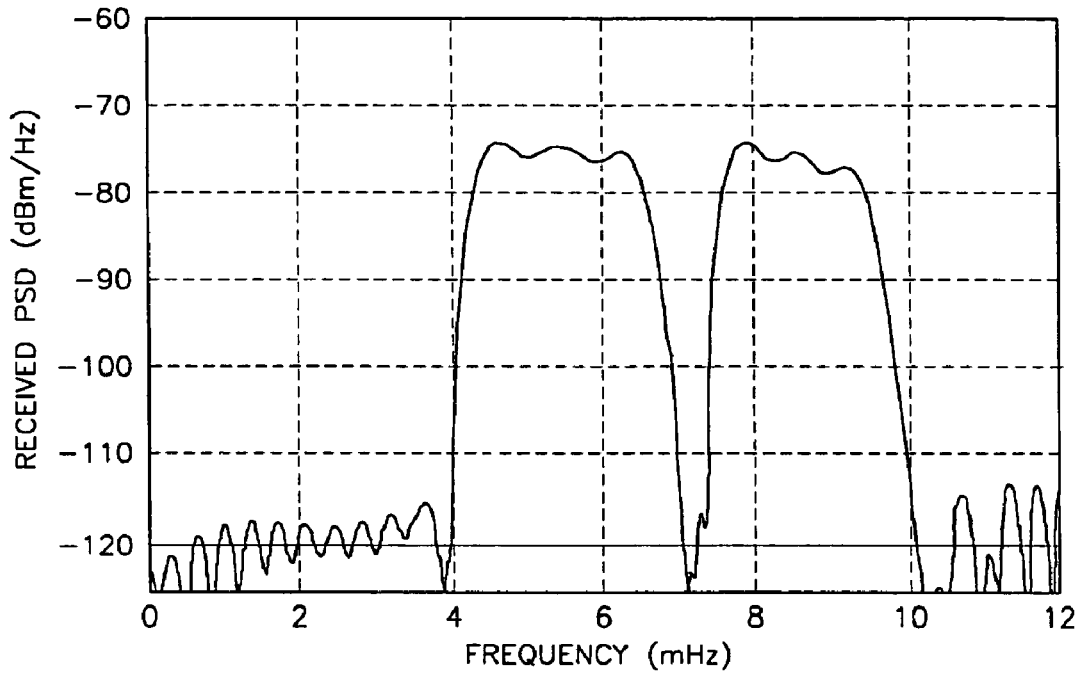
FIG. 3 shows the combined frequency response of the transmit and receive filters, including radio-frequency interference (RFI) suppression filters, for a transmission band between 4 and 10 Mhz.

For a single-carrier modulation scheme at a given baud rate, the theoretical channel capacity can be calculated as follows. The folded power spectrum is defined as $$|S_{hh}(\theta)|^2 \equiv \frac{1}{T}\sum_m \left|F\left(\frac{\theta+2\pi m}{2\pi T}\right)\right|^2,$$

where T is the symbol period (i.e., 1/T is the symbol baud rate), F(f) is the combined response of the transmit filters, the transmission channel, and any fixed receiver filters (see, e.g., FIG. 3), θ is the normalized baseband frequency (between −π and π), and m is all possible integers. (See Cioffi, Part I). The theoretical capacity (in bits per symbol) is then given by:

$$C(T) = \frac{1}{2\pi}\int_{-\pi}^{\pi}\log_2\left(1+\frac{S_2}{N_0}|S_{hh}(\theta)|^2\right)d\theta,$$

where $S_x$ is the average signal power at the input terminal of the transmit filter (see transmit filter 804 of FIG. 8) and $N_0$ is the double-sided power spectral density of the noise at the output terminal of the combined filter F(f), assumed to be white noise. It is also useful to define the signal-to-noise ratio at the slicer (see slicer 811 of FIG. 8) of an optimal receiver structure as $$SNR_{OPT}(T) \equiv 2^{C(1)}-1$$

From Equation A4, it is apparent that $$C(T)=\log_2(SNR_{OPT}+1).$$

The theoretical channel capacity C(T)/T (in bits per second) increases monotonically with the baud rate 1/T.

The theoretical channel capacity C(T) is an upper limit on the throughput that any transceiver can achieve with a symbol rate of 1/T. Achieving this theoretical limit, however, would require infinitely complex coding schemes. The achievable capacity of an actual modem can be given by the gap approximation:

$$C^{\Gamma}(T) = \log_2\left(1+\frac{SNR_{OPT}}{\Gamma}\right),$$

where Γ is the gap, which depends on the coding scheme and the desired bit error rate. For an ideal modem using an uncoded square constellation with a desired bit error rate of $1e^{-6}$, Γ is approximately 9 dB. The capacity of a practical modem, however, will be lower due to equalizer misadjustment, timing misadjustment, and other sources of implementation loss. In addition, some additional margin may be needed to accommodate time-varying noise events. Thus, for a practical modem, Γ may be around 15 dB.

Furthermore, to simplify the implementation of a transceiver, it is often desirable to use an integer number of bits per symbol. Subject to this constraint, the achievable capacity can be written as $$C_{int}^{\Gamma} = \left\lfloor\log_2\left(1+\frac{SNR_{OPT}}{\Gamma}\right)\right\rfloor,$$

where the floor brackets represent rounding down to the nearest lower integer. It is important to note that while the theoretical capacity, in bits per second, increases monotonically with the baud rate 1/T, the achievable capacity does not. On a severely distorted channel, reducing the baud rate may increase the achievable capacity.

FIG. 16 shows an example of the channel capacity versus achievable channel capacities for uncoded CAP modulation schemes (assuming a bit error rate of $10^{-6}$). The theoretical capacity, the achievable capacity (assuming a 9 dB gap) and the achievable capacity (having a 15 dB gap, including implementation loss and margin) is shown. As is seen from FIG. 16, with a 9 dB gap, 4-CAP (2 bits per symbol) modulation requires a SNR of 13.5 dB, 16-CAP (4 bits per symbol) modulation requires a SNR of 20.5 dB, and 64-CAP (6 bits per symbol) modulation requires a SNR of 26.8 dB. Achievable transmission capacities with a 15 dB gap (including margin) require a SNR of 19.5 dB for 4-CAP modulation, a SNR of 26.5 dB for 16-CAP modulation, and a SNR of 32.8 dB for 64-CAP modulation.

FDSCM for UWB

Figure 17:
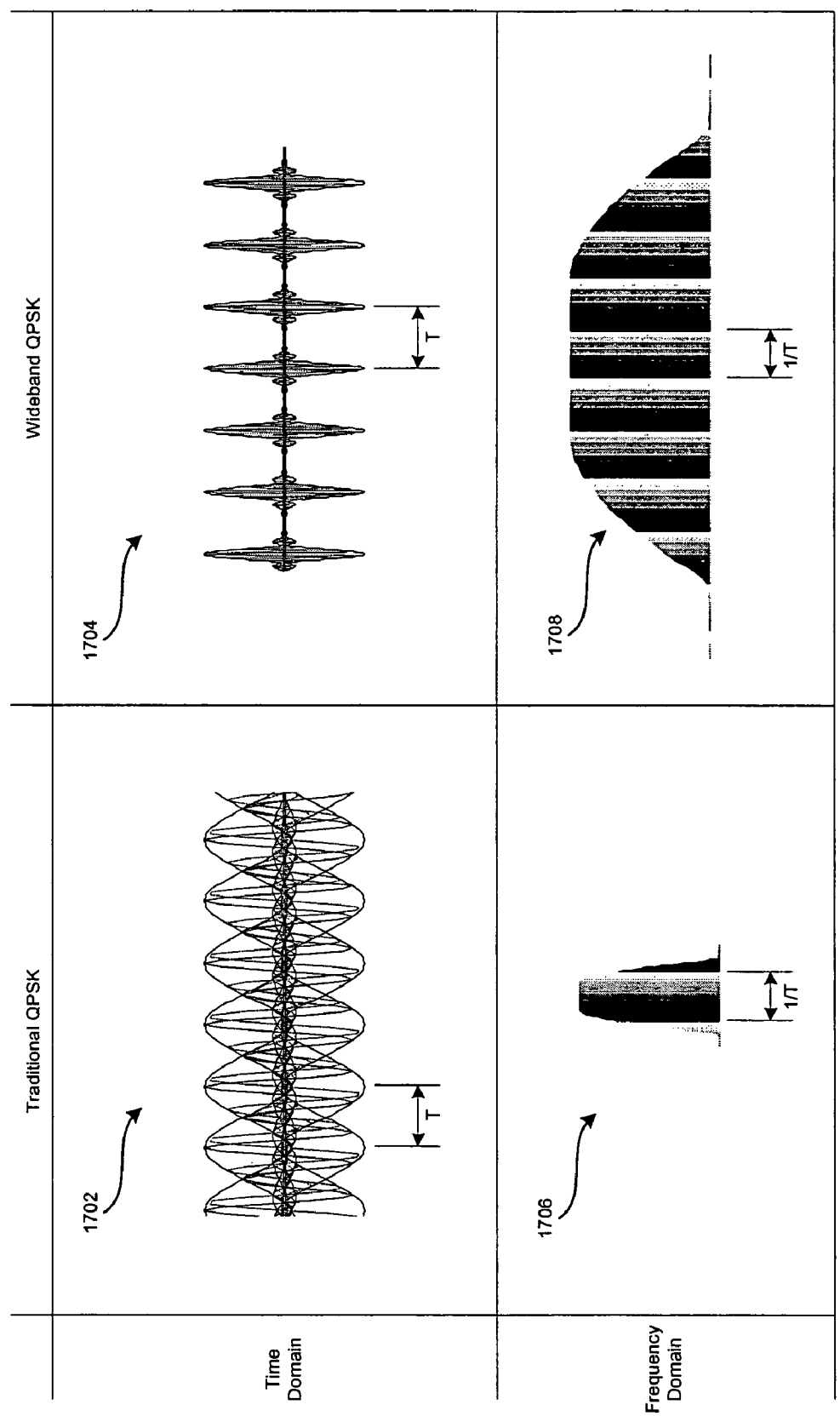
FIG. 17 shows a diagram that compares and illustrates differences between time and frequency domain signals for traditional single carrier modulation and frequency-diverse single carrier modulation, which may be utilized in connection with frequency diverse single carrier modulation for ultra-wide-band communication systems, in accordance with an embodiment of the invention.

FIG. 17 is a diagram that compares and illustrates differences between time and frequency domain signals for traditional single carrier modulation and frequency-diverse single carrier modulation, which may be utilized in connection with frequency diverse single carrier modulation for ultra-wide-band communication systems, in accordance with an embodiment of the invention. Referring to FIG. 17, there is shown a time domain traditional single carrier modulation (SCM) signal 1702, a frequency domain signal 1706 corresponding to the time domain traditional single carrier modulation signal 1702, a frequency-diverse single carrier modulation (FDSCM) signal 1704 and a frequency domain signal 1708 corresponding to the frequency-diverse single carrier modulation signal 1704.

In the time domain, the duration of the frequency-diverse single carrier modulation pulses in the wideband signal are relatively short when compared to the symbol period. In the frequency domain, the spectrum of the frequency-diverse single carrier modulation signal repeats itself every 1/T, thereby providing signal diversity. The period T is given by $1/f_{sym}$ where $f_{sym}$ is a symbol rate.

Figure 18:
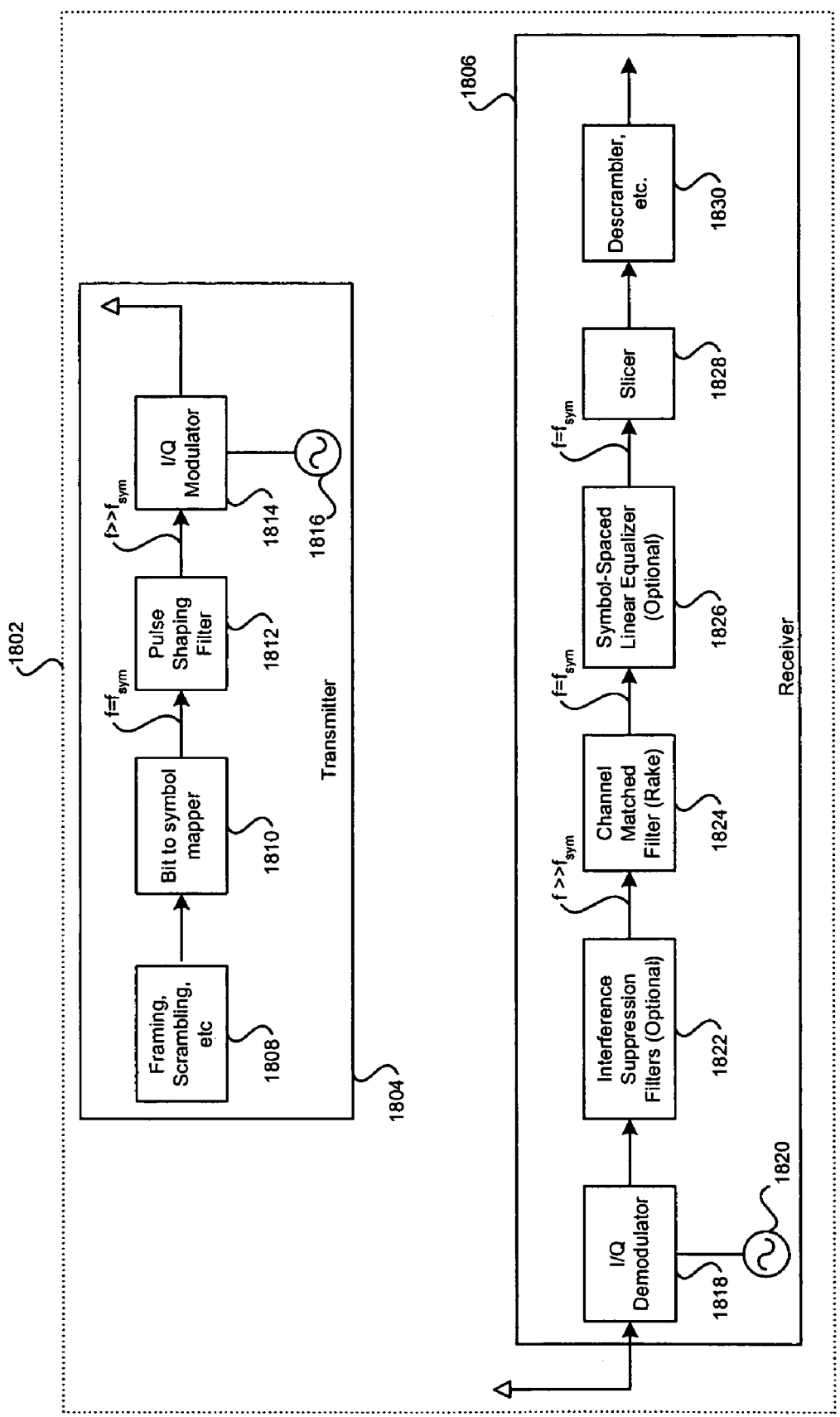
FIG. 18 shows a block diagram of an exemplary frequency-diverse single carrier modulation transceiver that may be utilized for ultra-wide-band, in accordance with an embodiment of the invention.

FIG. 18 is a block diagram of an exemplary frequency-diverse single carrier modulation transceiver that may be utilized for ultra-wide-band in accordance with an embodiment of the invention. Referring to FIG. 18, the frequency-diverse single carrier modulation transceiver 1802 comprises a transmitter block 1804 and a receiver block 1806. The transmitter block 1804 comprises a framing and scrambling block 1808, a bit-to-symbol mapper block 1810, a pulse shaping filter block 1812 and an I/Q modulator block 1812. The transmitter block 1804 may further comprise a local oscillator 1816, which may be coupled to the I/Q modulator 1814.

The framing and scrambling block 1808 may comprise suitable logic, circuitry and/or code, which may be utilized to frame and scramble the data in a bit stream which is to be transmitted. The framing and scrambling block 1808 may be a standardized or conventional data framing and scrambling block.

The bit-to-symbol mapper block 1810 may comprise suitable logic, circuitry and/or code, which may be adapted to map data bits in to symbols. Resulting data produced by the bit-to-symbol mapper block 1810 has a sample rate of f$_{sym}$ where f$_{sym}$ is a symbol rate. The bit-to-symbol mapper 1810 may typically be a quadrature phase shift keying (QPSK) mapper, but other constellations may be utilized. For example, the bit-to-symbol mapper 1810 may utilize bi-orthogonal phase shift keying (BPSK), 8-PSK, or 16-QAM (quadrature amplitude modulation). Although quadrature phase shift keying may provide the best combination of performance and complexity, the invention may not be limited to using QPSK constellation.

The pulse shaping filter block 1812 may comprise suitable filters, which may be utilized to shape signal pulses in order to generate I and Q components for subsequent modulation. The spectral bandwidth of the pulse shaping filter block 1812 is at least twice the symbol rate f$_{sym}$. The pulse shaping filter block 1810 may be adapted to have many possible structures and characteristics. For example, the pulse shaping filter block 1810 may be analog or digital, finite-impulse response (FIR) or infinite-impulse-response (IIR), and it could have a wide range of possible shapes. Possible design criteria for the pulse shaping filter block 1812 may include minimizing the passband ripple and minimizing the peak-to-average ratio (PAR) of the transmitted signal. A requirement for this system is that the bandwidth must be significantly greater than the symbol rate f$_{sym}$. After constellation encoding occurs in the bit-to-symbol mapper block 1810, a resulting encoded signal may be passed through the pulse-shaping filter whose spectral bandwidth is at least twice the symbol rate f$_{sym}$. Typically, in an ultra-wide-band environment, the spectral bandwidth will be several times larger than f$_{sym}$.

The I/Q modulator block 1814 may be utilized to modulate the in-phase (I) and/or quadrature (Q) components. In this regard, the I/Q modulator 1814 may be adapted to separately modulate the in-phase and/or quadrature components to provide greater transmitter and receiver flexibility and versatility.

The local oscillator 1814 is adapted to provide a local oscillating signal at a specific frequency, which may be utilized to drive the I/Q modulator block 1812 during modulation.

In accordance with an embodiment of the invention, in operation, the output signal generated from the bit-to-symbol mapper block 1810 is sampled at a rate f$_{sym}$, where f$_{sym}$ is the symbol rate. After the pulse-shaping filter 1812 processes the output signal generated by the bit-to-symbol mapper block 1810, the output signal generated by the pulse shaping filter 1812 has a sample rate f which is significantly greater than the symbol rate f$_{sym}$, if the output of the pulse shaping filter is a digital signal.

Referring to FIG. 18, the exemplary receiver 1806 may comprise an I/Q demodulator block 1818, an interference suppression filter block 1822, a channel matched filter block 1824, a symbol spaced linear equalizer block 1826, a slicer block 1828, and a descrambler block 1914. The exemplary receiver 1806 of FIG. 18 may further comprise a local oscillator block 1820.

The I/Q demodulator block 1818 may comprise suitable logic, circuitry and/or code, which may be adapted to receive and demodulate the in-phase (I) and/or quadrature (Q) components containing modulated information.

The interference suppression filter block 1822 may comprise suitable logic, circuitry and/or code, which may be adapted to filter out or suppress any unwanted signals such as narrowband interference. The interference suppression filter block 1822 may be an optional FDSCM receiver block. The exact location of the interference rejection filters, if present, may not be critical to practicing the invention. For example, this filter could precede the I/Q demodulator block 1818.

The channel matched filter (CMF) block 1824 may comprise suitable logic, circuitry and/or code, and is an information-lossless receiver front end. The channel matched filter block 1824 is also known as a rake filter. In a traditional direct sequence spread spectrum (DSSS) system, the CMF output is typically sampled at the chip rate, which, for a given data rate, may be much higher than a symbol rate f$_{sym}$ utilized in a FDSCM system. In an ultra-wide-band system, the channel response may be very long relative to the sampling rate, so the channel matched filter may dominate the complexity of the receiver. This complexity may involve, for example, chip real estate and/or power consumption. Accordingly, by sampling the channel matched filter 1824 at a lower rate, a frequency diverse single carrier modulation system may have a much lower complexity than conventional direct sequence spread spectrum systems.

The symbol-spaced linear equalizer block 1826 may comprise suitable logic, circuitry and/or code, for linear equalizing an output of the channel matched filter block 1824. The symbol-spaced linear equalizer block 1826 may be an optional FDSCM receiver block. The symbol-spaced linear equalizer block 1826 becomes more beneficial as the ratio of spectral bandwidth to symbol rate decreases. Since both the input and output of the symbol-spaced linear equalizer block 1826 are at the symbol rate, its complexity is usually relatively low.

The slicer block 1828, may comprise suitable logic, circuitry and/or code, which may be utilized to decode the data by choosing the constellation point closest to the received signal.

The descrambler block 1830 may comprise suitable logic, circuitry and/or code, which may be utilized to descramble an output of the slicer block 1828.

The local oscillator 1820 block may be coupled to the I/Q demodulator block 1818. The local oscillator 1820 may be adapted to provide a local oscillating signal at a specific frequency, which may be utilized to drive the I/Q demodulator block 1818 during demodulation.

In accordance with an embodiment of the invention, in operation, the output signal generated from the interference suppression filter block 1822 has a sample rate f, which is significantly greater than the symbol rate f$_{sym}$. A resulting output signal generated from the channel matched filter block 1824 has a sample rate f, which is equivalent to f$_{sym}$. A resulting output signal generated from the symbol spaced linear equalizer block has a sample rate f, which is equivalent to f$_{sym}$. Accordingly, for the receiver 1806, the output signal filtered by a channel matched filter block 1824 is sampled at the symbol rate, while its input is sampled at a rate much greater than the symbol rate. The channel matched filter block 1824 may be matched to the combined shape of the transmitted pulse and wireless channel. The channel matched filter block 1824 may be determined by various well-known channel-estimation methods using a preamble of a received signal, where the preamble comprises known symbols.

Symbol Rate Offsets

In instances where adjacent or neighboring piconets share the same spectrum, performance may be improved by requiring each piconet to transmit at a slightly different symbol rate. One reason for this is spreading gain. In an ideal additive-white-Gaussian noise (AWGN) environment, a channel matched or rake filter tends to amplify a desired signal without amplifying an undesired noise. This amplification effect may be referred to as spreading gain, or processing gain. However, when interference from similar systems is present, it may be possible in certain situations for the channel matched filter to also amplify the interference. This may occur in instances when the channel response and timing of the interference signal is similar to that of the desired signal. In order to deal with this situation, a slight symbol-rate offset may be utilized to take care of or mitigate those instances where unwanted signals may also be amplified.

Figure 19:
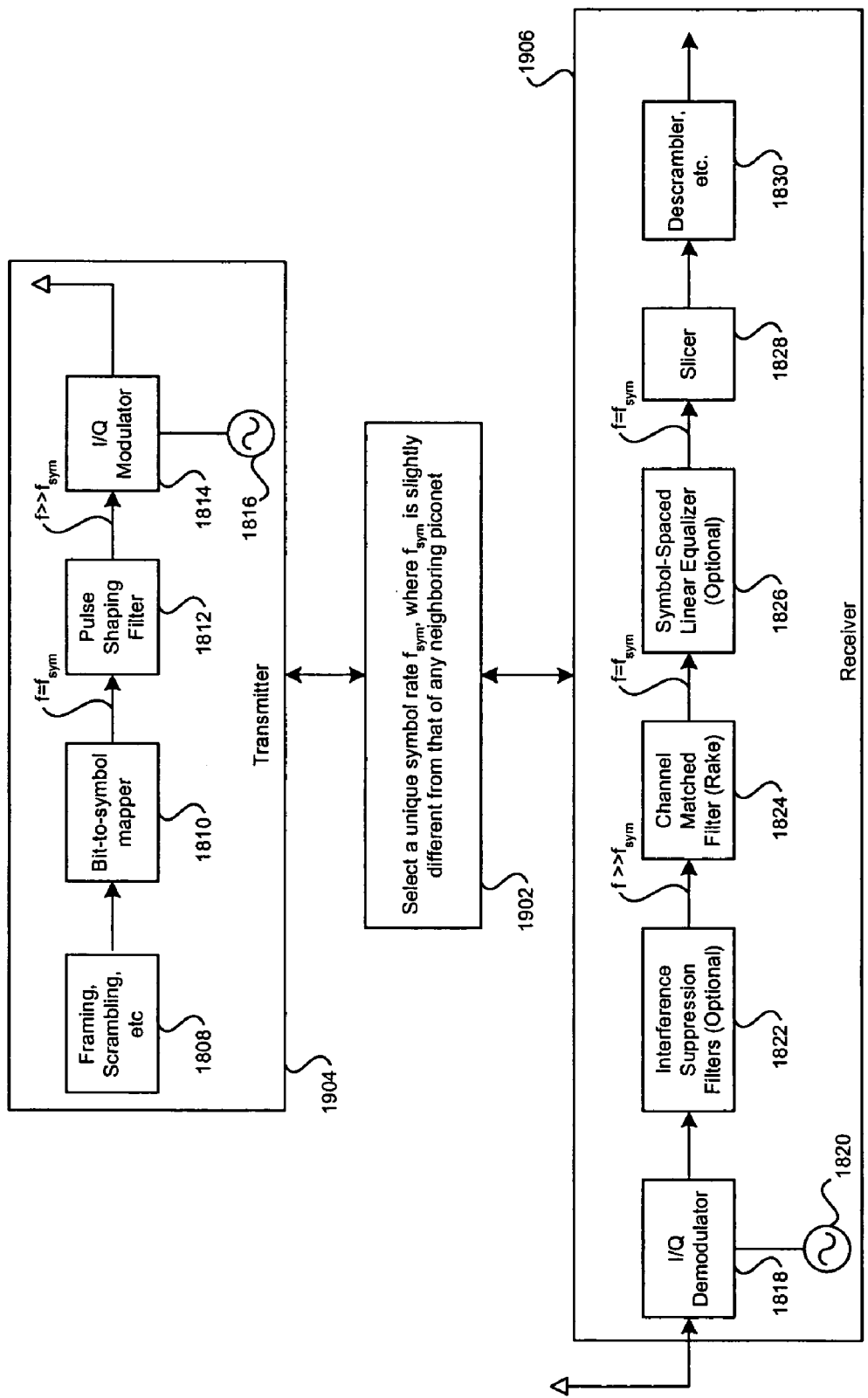
FIG. 19 shows a block diagram of an exemplary system in which each neighboring piconet utilizes a slightly different symbol rate, in accordance with an embodiment of the invention.

FIG. 19 is a block diagram of an exemplary system in which each neighboring piconet utilizes a slightly different symbol rate in accordance with an embodiment of the invention. Referring to FIG. 19, the exemplary system comprises a transmitter 1904 and a receiver 1906, which are similar to the transmitter 1804 and receiver 1806 illustrated in FIG. 18. Additionally, FIG. 19 also comprises a selection block 1902 which illustrates the selection of a unique symbol rate $f_{sym}$, where $f_{sym}$ is slightly different from that of any neighboring or adjacent piconet.

A unique symbol-rate offset may be selected using one or more methods. For example, a piconet controller may be configured to passively scan its environment in order to determine which symbol rates are already in use. In this regard, the piconet controller may be adapted to scan a finite or predefined set of symbol rates, which may be allocated or specified by standard or assignment. Once the symbol rated utilized by neighboring or adjacent piconets have been determined, the piconet controller may be configured to select a symbol rate that is not being utilized in the adjacent piconets.

Interleaving and Coding

Most communication systems employ some type of coding in order to improve immunity to noise and interference. In this regard, coding increases the achievable data rate for a given noise level and target error rate. A convolutional code is one type of code that may be especially well-suited for low SNR environments, including ultra-wide-band environment. Many other types of codes may be utilized, including turbo codes, low density parity check codes (LDPC), Reed-Solomon (RS) codes or BCH codes. These codes may also be concatenated to make stronger codes. One popular combination is a Reed-Solomon (RS) outer code with a convolutional inner code. Coding may also be utilized in an ultra-wide-band system.

In order to enhance the performance of a frequency division single carrier modulation ultra-wide-band system using coding, an interleaver and an encoder may be added to the transmitter 1804 of FIG. 18. Accordingly, a corresponding de-interleaver and a decoder may be added to the receiver 1806 of FIG. 18. Referring to FIG. 18, the encoder and interleaver may be placed between the framing and scrambling block 1804 and the bit-to-symbol mapper 1810 of the receiver 1804.

Figure 20:
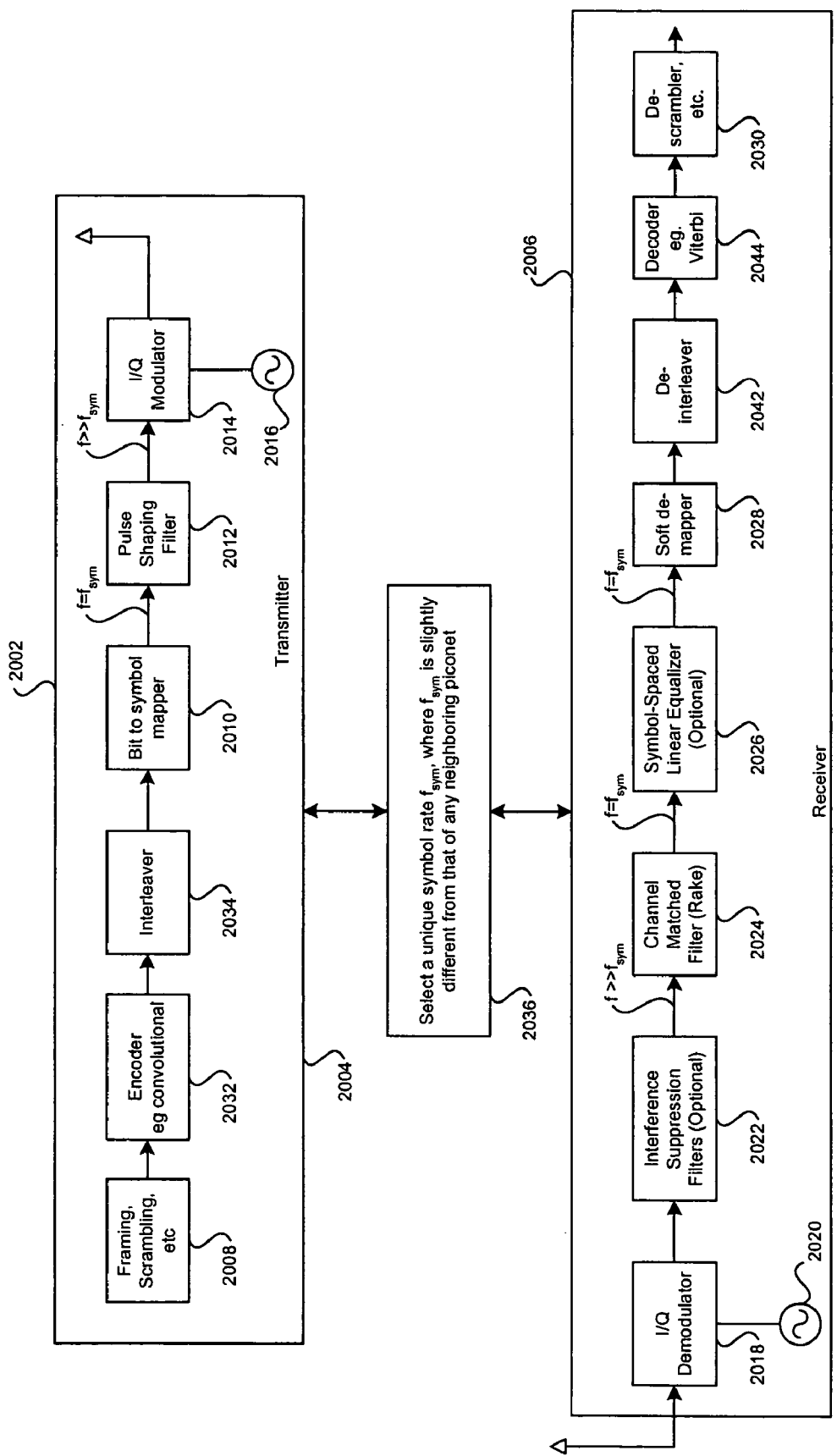
FIG. 20 shows a block diagram of an exemplary system that utilizes an encoder and an interleaver in a transmitter, and a decoder and de-interleaver in the receiver to enhance performance, in accordance with an embodiment of the invention.

FIG. 20 is a block diagram of an exemplary system that utilizes an encoder and an interleaver in a transmitter, and a decoder and de-interleaver in the receiver to enhance performance, in accordance with an embodiment of the invention. Referring to FIG. 20, there is shown a transmitter 2004 and a receiver 2006. The transmitter 2004 may comprise a framing and scrambling block 2008, an encoder block 2032, an interleaver block 2034, a bit-to-symbol mapper block 2010, a pulse shaping filter block 2012 and an I/Q modulator block 2012. The transmitter block 2004 may further comprise a local oscillator 2016, which may be coupled to the I/Q modulator 2014. The exemplary receiver 2006 may comprise an I/Q demodulator block 2018, an interference suppression filter block 2022, a channel matched filter block 2024, a symbol spaced linear equalizer block 2026, a soft de-mapper 2028, a de-interleaver block 2042, a decoder block 2044, and a descrambler block 2030. The exemplary receiver 2006 of FIG. 20 may further comprise a local oscillator block 2020. A selection block 2036 illustrates the selection of a unique symbol rate $f_{sym}$, where $f_{sym}$ is slightly different from that of any neighboring or adjacent piconet.

Referring to the transmitter 2004, the framing and scrambling block 2008, bit-to-symbol mapper block 2010, pulse shaping filter block 2012 and I/Q modulator block 2012 are similar to the corresponding blocks in FIG. 18. The encoder block 2032 may be, for example, a convolutional encoder. The interleaver block 2034 may be utilized to rearrange the order of the bits in a signal. There are several different types of interleavers, including row-column interleavers, convolutional interleavers, and random interleavers. The invention is not limited to the use of a particular type of interleaver and any type of interleaver may be utilized. Without an interleaver, the performance of the system would be limited by the short-term worst-case processing gain, which occurs when the phase of the interfering signal and phase of the desired signal are aligned such that the channel responses are highly correlated. The interleaver guarantees that adjacent coded bits are spaced far apart in time when transmitted. This enables the system to take advantage of the long-term average processing gain, rather than being limited by the short-term worst case processing gain.

Referring to the receiver 2006, the I/Q demodulator block 2018, interference suppression filter block 2022, channel matched filter block 2024, symbol spaced linear equalizer block 2026 and descrambler block 2030 are similar to the corresponding blocks in FIG. 18.

The soft demapper block 2028 may be utilized to provide soft-decisions for the decoder band on, for example, the bit-to-symbol mapping which was utilized by the transmitter 2002. The soft de-mapper 2028 is placed before the de-interleaver 2042 and replaces the slicer 1828 of FIG. 19.

The deinterleaver block 2042 may comprise suitable logic, circuitry and/or code, which may be utilized to rearrange the order of the samples so as to undo the arrangement done by the interleaver.

The decoder block 2044 may be, for example, a Viterbi decoder, which finds the most likely sequence of transmitted bits based on the received samples.

At the transmitter 2002, the coded bits are interleaved by the interleaver block 2034 prior to transmission over an ultra-wide-band communication channel. At the receiver 2006, the soft-decisions generated by the soft-demapper block 2028 may be de-interleaved by the de-interleaver block 2042 before being decoded by the decoder block 2044. The soft-demapper block 2028 may be configured to provide soft-decisions for the decoder block 2044, which may be based on the bit-to-symbol mapping from the transmitter 2002. For a QPSK constellation, for example, the soft demapper-block 2028 block may be adapted to break the complex signal into its real and imaginary components in their proper order based on the bit-to-symbol mapping.

A wide range of symbol-rate offsets may be utilized in the system of FIG. 20. However, in instances where smaller offsets are utilized, the smaller offsets may require larger interleavers, thereby increasing the memory requirements and latency of the decoder. Accordingly, in order to ensure the interleaver remains relatively small, symbol rate offsets on the order of, for example, one part in 100 may be utilized. This offset may be much smaller, for example, 1 part in 1000, or much larger, for example, 1 part in 10, without deviating from the various aspects of the invention.

Frequency diverse single carrier modulation (FDSCM) is especially well-suited for ultra-wide-band communication systems. For a given data rate, FDSCM has similar performance and but a much lower complexity than traditional direct sequence spread spectrum (DSSS) systems. The complexity savings may be derived from sampling the channel matched filter or rake filter output at the FDSCM symbol rate, instead of sampling it at the chip rate in a DSSS system. For a given data rate, the symbol rate of an FDSCM system is typically much lower than the chip rate of a DSSS system. In order to optimally adapt FDSCM to the ultra-wide-band applications that are prone to interference from similar neighboring systems, the symbol-rate offsets along with an interleaver placed after the encoder may be utilized to take advantage of the long-term average processing gain of the system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A transceiver system comprising:
    a first passband single carrier transmitter coupled to a first ultra-wide-band wireless transmission channel; and
    a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter.

2. The transceiver system according to claim 1, wherein said first passband single carrier transmitter and said first receiver coupled to said first ultra-wide-band wireless transmission channel is a first piconet.

3. The transceiver system according to claim 2, wherein said first passband single carrier transmitter within said first piconet scans channels to determine symbol rates that are being utilized in neighboring piconets.

4. The transceiver system according to claim 3, wherein said first passband single carrier transmitter within said first piconet selects for use a symbol rate that differs from said determined symbol rates that are being utilized in said neighboring piconets.

5. A method for communicating information wirelessly, the method comprising:
    transmitting signals via a first passband single carrier transmitter coupled to a first ultra-wide-band wireless transmission channel; and
    receiving said transmitted signals by a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter.

6. The method according to claim 5, wherein said first passband single carrier transmitter and said a first receiver coupled to said first ultra-wide-band wireless transmission channel is a first piconet.

7. The method according to claim 6, comprising scanning channels by said first passband single carrier transmitter within said first piconet to determine symbol rates that are being utilized in neighboring piconets.

8. The method according to claim 7, comprising selecting for use a symbol rate that differs from said determined symbol rates that are being utilized in said neighboring piconets by said first passband single carrier transmitter within said first piconet.

9. A transceiver system, comprising:
    a passband single carrier transmitter coupled to an ultra-wide-band wireless transmission channel, wherein said passband single carrier transmitter modulates a signal at a baud rate such that any spectral region of the signal is transmitted substantially by at least two spectral regions separated by integer multiples of the baud rate; and
    a receiver coupled to said ultra-wide-band wireless transmission channel, wherein said receiver receives signals transmitted by said passband single carrier transmitter over said first ultra-wide-band wireless transmission channel and processes said at least two spectral regions to coherently sum said at least two spectral regions.

10. A method for communicating information in a wireless channel, the method comprising:
    transmitting, using a passband single carrier transmitter, a symbol stream to a lossy ultra-wide-band wireless transmission channel at an adaptively chosen baud rate that is based on said lossy ultra-wide-band wireless transmission channel, said adaptively chosen baud rate varying over a range that includes baud rates less than or equal to half of a spectral bandwidth of said transmitted symbol stream.

11. The method according to claim 10, comprising receiving said transmitted symbol stream from said lossy ultra-wide-band wireless transmission channel.

12. The method according to claim 10, comprising transmitting error-sensitive data at a lower baud rate that is utilized to transmit less error-sensitive data over said lossy ultra-wide-band wireless transmission channel.

13. A method for communicating information in a wireless channel, the method comprising:
receiving a symbol stream from a lossy ultra-wide-band wireless communication channel, wherein said symbol stream is transmitted from a passband single carrier transmitter at an adaptively chosen baud rate that is based on said lossy ultra-wide-band wireless transmission channel, said adaptively chosen baud rate varying over a range that includes baud rates less than or equal to half of a spectral bandwidth of said transmitted symbol stream.

14. A communication system, comprising:
a receiver coupled to an ultra-wide-band wireless transmission channel that receives signals transmitted by a passband single carrier transmitter at a baud rate less than or equal to half of a spectral bandwidth of said signals transmitted by said passband single carrier transmitter.

15. A transceiver system comprising:
a first passband single carrier transmitter coupled to a first ultra-wide-band wireless transmission channel;
a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter, wherein said first passband single carrier transmitter and said first receiver coupled to said first ultra-wide-band wireless transmission channel is a first piconet;
a second passband single carrier transmitter coupled to a second ultra-wide-band wireless transmission channel;
a second receiver coupled to said second ultra-wide-band wireless transmission channel, wherein:
said second receiver receives signals transmitted by said second passband single carrier transmitter over said second ultra-wide-band wireless transmission channel at a baud rate less than or equal to half of a spectral bandwidth of said signal transmitted by said second passband single carrier transmitter; and
said second passband single carrier transmitter and said second receiver coupled to said second ultra-wide-band wireless transmission channel is a second piconet, wherein said second piconet is adjacent to said first piconet.

16. The transceiver system according to claim 15, wherein said first passband single carrier transmitter transmits data within said first piconet at a first symbol rate and said second passband single carrier transmitter transmits data within said second piconet at a second symbol rate.

17. A transceiver system comprising:
a first passband single carrier transmitter coupled to a first ultra-wide-band wireless transmission channel, wherein said first passband single carrier transmitter comprises an encoder that encodes bits to be transmitted in said transmitted signals with a code rate R, where R<1; and
a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter.

18. A transceiver system comprising:
a first passband single carrier transmitter coupled to a first ultra-wide-band wireless transmission channel, wherein said first passband single carrier transmitter comprises
an encoder that encodes bits to be transmitted in said transmitted signals with a code rate R, where R<1;
an interleaver that interleaves said encoded bits so that adjacent encoded bits are mapped to symbols widely separated in time in said transmitted signals; and
a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter.

19. A transceiver system comprising:
a first passband single carrier transmitter coupled to a first ultra-wide-band wireless transmission channel; and
a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter, wherein said first receiver comprises a channel matched filter sampled at a symbol rate.

20. A transceiver system comprising:
a first passband single carrier transmitter coupled to a first ultra-wide-band wireless transmission channel; and
a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter, wherein said first receiver comprises a channel matched filter sampled at a symbol rate and a symbol-spaced linear equalizer sampled at said symbol rate.

21. A method for communicating information wirelessly, the method comprising:
transmitting signals via a first passband single carrier transmitter coupled to a first ultra-wide-band wireless transmission channel,
receiving said transmitted signals by a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter; wherein said first passband single carrier transmitter and said a first receiver coupled to said first ultra-wide-band wireless transmission channel is a first piconet;
coupling a second passband single carrier transmitter to a second ultra-wide-band wireless transmission channel; and coupling a second receiver to said second ultra-wide-band wireless transmission channel; and receiving by said second receiver, signals transmitted by said second passband single carrier transmitter over said second ultra-wide-band wireless transmission channel at a baud rate less than or equal to half of a spectral bandwidth of said signal transmitted by said second passband single carrier transmitter, wherein:

said second receiver receives signals transmitted by said second passband single carrier transmitter via said second ultra-wide-band wireless transmission channel at a baud rate less than or equal to half of a spectral bandwidth of said signal transmitted by said second passband single carrier transmitter, and said second passband single carrier transmitter and said second receiver coupled to said second ultra-wide-band wireless transmission channel is a second piconet, wherein said second piconet is adjacent to said first piconet.

22. The method according to claim 21, comprising:

transmitting data within said first piconet at a first symbol rate by said first passband single carrier transmitter; and transmitting data within said second piconet at a second symbol rate by said second passband single carrier transmitter.

23. A method for communicating information wirelessly, the method comprising:

transmitting signals via a first passband single carrier transmitter coupled to a first ultra-wide-band wireless transmission channel;

receiving said transmitted signals by a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter; and encoding bits to be transmitted in said transmitted signals by an encoder integrated within said first passband single carrier transmitter with a code rate R, where R<1.

24. A method for communicating information wirelessly, the method comprising:

transmitting signals via a first passband single carrier transmitter coupled to a first ultra-wide-band wireless transmission channel;

receiving said transmitted signals by a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter;

encoding bits to be transmitted in said transmitted signals by an encoder integrated within said first passband single carrier transmitter with a code rate R, where R<1; and interleaving said encoded bits by an interleaver integrated within said transmitter so that adjacent encoded bits are mapped to symbols widely separated in time in said transmitted signals.

25. A method for communicating information wirelessly, the method comprising:

transmitting signals via a first passband single carrier transmitter coupled to a first ultra-wide-band wireless transmission channel;

receiving said transmitted signals by a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter; and sampling a channel matched filter integrated within said first receiver at said symbol rate.

26. A method for communicating information wirelessly, the method comprising:

transmitting signals via a first passband single carrier transmitter coupled to a first ultra-wide-band wireless transmission channel;

receiving said transmitted signals by a first receiver coupled to said first ultra-wide-band wireless transmission channel, wherein said first receiver receives signals transmitted by said first passband single carrier transmitter over said first ultra-wide-band wireless transmission channel at a baud rate less than or equal to half of a spectral bandwidth of said signal transmitted by said first passband single carrier transmitter;

sampling a channel matched filter integrated within said first receiver at said symbol rate; and sampling a symbol-spaced linear equalizer integrated within said first receiver at said symbol rate.

* * * * *